(12) United States Patent
Naito

(10) Patent No.: US 9,601,729 B2
(45) Date of Patent: Mar. 21, 2017

(54) BATTERY PACK FOR POWER TOOL

(71) Applicant: MAKITA CORPORATION, Anjo-Shi (JP)

(72) Inventor: Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 158 days.

(21) Appl. No.: 14/618,039

(22) Filed: Feb. 10, 2015

(65) Prior Publication Data

US 2015/0249237 A1 Sep. 3, 2015

(30) Foreign Application Priority Data

Mar. 3, 2014 (JP) .................................. 2014040355

(51) Int. Cl.
*H01M 2/10* (2006.01)
*B25F 5/00* (2006.01)
*H01R 12/58* (2011.01)
*H01R 13/11* (2006.01)
*H01M 10/42* (2006.01)

(52) U.S. Cl.
CPC ............ *H01M 2/1055* (2013.01); *B25F 5/00* (2013.01); *H01M 2/1022* (2013.01); *H01R 12/58* (2013.01); *H01R 13/111* (2013.01); *H01M 10/4257* (2013.01); *H01M 2220/30* (2013.01)

(58) Field of Classification Search
CPC ......................................................... B25F 5/00
See application file for complete search history.

(56) References Cited

U.S. PATENT DOCUMENTS

| 6,350,149 | B1 | 2/2002 | Nakane |
| 2008/0084181 | A1 | 4/2008 | Griffin |
| 2013/0143452 | A1 | 6/2013 | Yoshikawa |

(Continued)

FOREIGN PATENT DOCUMENTS

JP 2001-57204 2/2001

OTHER PUBLICATIONS

Extended European Search Report from the European Patent Office dated Jul. 27, 2015 in related EP application No. 15 154 908.6, including European Search Opinion, European Search Report, and examined claims 1-11.

*Primary Examiner* — Imran Akram
(74) *Attorney, Agent, or Firm* — J-Tek Law PLLC; Jeffrey D. Tekanic; Scott T. Wakeman

(57) ABSTRACT

A power-tool battery pack usable as a power supply of a power tool and capable of slidably attaching to and detaching from a tool main body of the power tool includes a battery main body and a case that houses the battery main body. The battery main body includes a female terminal having inner sides configured to electrically connect to and sandwich a male terminal slidably attachable to the battery pack. The case includes a case main body and a case-cover part. The case-cover part has an opening for receiving the male terminal and sandwiching-wall parts for sandwiching the female terminal from outer sides of the female terminal. The female terminal and the sandwiching-wall parts are configured such that, at least when the female terminal sandwiches the male terminal, parts of the female terminal facing the sandwiching-wall parts are caused to touch the sandwiching-wall parts.

19 Claims, 38 Drawing Sheets

(56) References Cited

U.S. PATENT DOCUMENTS

2013/0224539 A1\* 8/2013 Hayashi .............. H01M 2/1055
  429/82
2014/0106195 A1\* 4/2014 Milbourne .......... H01M 2/1022
  429/99

\* cited by examiner

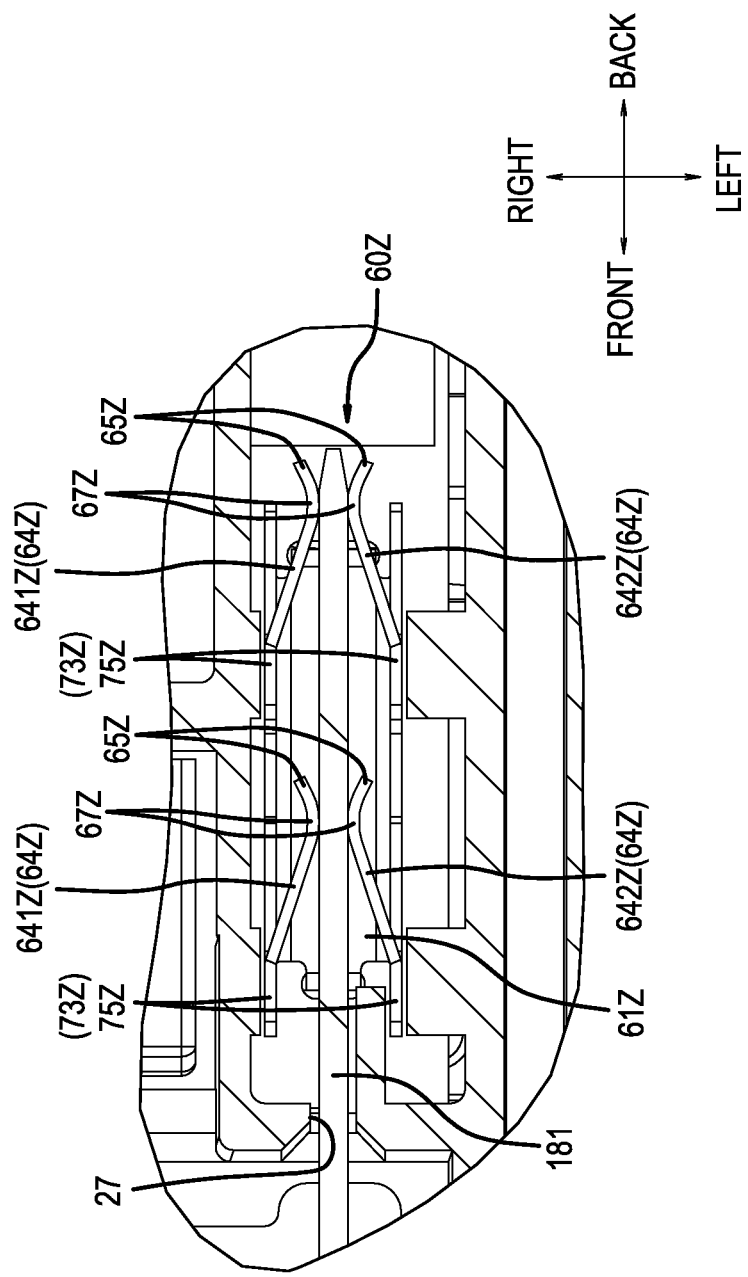

BATTERY PACK FOR POWER TOOL

CROSS-REFERENCE TO RELATED APPLICATION

The present application claims priority to Japanese patent application serial number 2014-040355 filed on Mar. 3, 2014, the contents of which are incorporated fully herein.

TECHNICAL FIELD

The present disclosure is directed to a power-tool battery pack suitable for use as a power supply for a power tool and that is attachable to and detachable from a tool main body of a power tool.

BACKGROUND ART

In recent years power tools often include a power-tool battery pack. The power tool battery pack is attachable to and detachable from a main body of a power tool and functions as a power supply for the power tool. Such a power-tool battery pack generally comprises a battery main body and a case that houses the battery main body. The battery main body may comprise, for example, a plurality of rechargeable battery cells and a circuit board electrically connected to the battery cells for controlling charging and discharging of the battery cells. When the amount of charge in such a battery pack falls below a certain level or threshold, the power-tool battery pack is detached from the tool main body and then charged using a specialized charger. After being charged by the specialized charger, the power-tool battery pack is once again mounted onto the tool main body and used as the power-tool power supply.

One known type of power-tool battery pack is mountable by sliding it relative to the tool main body, the specialized charger, or the like. These power-tool battery packs are provided: with a sliding-guide structure to facilitate the slide mounting and with connection terminals that are electrically connectable to a counterpart side by performing the slide mounting as shown, for example in Japanese Laid-open Patent Publication 2001-57204 and its family member U.S. Pat. No. 6,350,149. Specifically, the tool main body and the specialized charger, for example, may be provided with plate-shaped male terminals, and the power-tool battery pack may be provided with female terminals that form an electrical connection with the male terminals when the male terminals are slidingly inserted into the female terminals.

SUMMARY

It may sometimes be necessary or desirable to modify the internal structure of a power-tool battery pack. It may thus also be necessary to change the design of the female terminals of the power-tool battery pack slightly in order to match or accommodate the modified internal structure. Specifically, the size, shape, or configuration of the female terminals may be changed slightly. At the same time, the electrical connection between each male terminal and its corresponding female terminal is accomplished (achieved) by the female terminal "sandwiching" the male terminal (that is, by directly bordering or contacting opposite sides of the male terminal and/or pressing in on the male terminal from two, generally-opposing directions, such that the male terminal is interleaved and squeezed between the two parts of the female terminal).

Moreover, the male terminal is preferably sandwiched (squeezed) by the female terminals with an appropriate force or load so that wear on the female terminal caused by the sandwiching (i.e. the inserting and removing of the male terminal) is reduced while a satisfactory electrical connection is obtained. In other words, if the female terminals press too tightly against the male terminals, the female terminals may wear too rapidly with repeated use; on the other hand, if the female terminals do not press tightly enough on or against the male terminals, an adequate electrical connection may not be formed. Therefore, seemingly minor changes to the configuration of the internal structures of a battery pack may significant affect the electrical connection that can be formed between electrical terminals of the battery pack and electrical terminals of another structure.

The present disclosure addresses the foregoing problem, and an aspect of the present disclosure is to provide a power-tool battery pack that serves as a power supply of a power tool and that is attachable to and detachable from a tool main body of the power tool. The power-tool battery pack is preferably configured such that, even if the design of a female terminal is changed slightly, the sandwiching (squeezing) load (force) applied by the female terminal against a male terminal inserted into the female terminal is maintained at an appropriate load (force).

A power-tool battery back according to the present disclosure may preferably address one or more of the other problems discussed below. For example, a power-tool battery pack according to a first aspect of the disclosure is preferably capable of attaching to and detaching from a tool main body of the power tool by a sliding movement. The battery pack may comprise a battery main body and a case housing the battery main body. The battery main body preferably comprises a female terminal having mutually facing inner sides configured to electrically connect to and sandwich (squeeze) a counterpart male terminal from opposite sides when the male terminal is slidingly mounted to (inserted into) the female terminal. The case preferably comprises a case main body configured to house or accommodate principal portions of the battery main body and a case-cover part connectable to the case main body. The case-cover part in turn comprises an opening having an interior that is capable of receiving a male terminal and having sandwiching-wall parts. The sandwiching wall parts are configured to sandwich (border and/or squeeze) the female terminal at or from its outer sides in sandwiching directions of (facing toward) the male terminal. The female terminal and the sandwiching-wall parts are configured such that, at least when the female terminal sandwiches the male terminal, parts of the female terminal facing the sandwiching-wall parts (facing outwardly away from the male terminal) serve as abutting-support parts and touch the sandwiching-wall parts.

In such a power-tool battery pack according to the first aspect of the disclosure, the sandwiching-wall parts, which sandwich (border) the female terminal, are provided in the case-cover part. The female terminal and the sandwiching-wall parts are configured in this aspect such that, when the female terminal is sandwiching (squeezing) the male terminal, parts of the female terminal that face the sandwiching-wall parts act as the abutting-support parts and are caused to touch the sandwiching-wall parts. In this manner, when the female terminal is sandwiching (squeezing) the male terminal, the abutting-support parts are in contact with the sandwiching-wall parts and thereby receive support from the sandwiching-wall parts. Accordingly, even if the design of the female terminal is changed slightly, the sandwiching load of the female terminal sandwiching (squeezing) the male terminal can be maintained at an appropriate load, thus making minor design changes possible.

In addition, a power-tool battery pack according to a second aspect of the disclosure preferably has female terminals and sandwiching-wall parts that are configured such that they are non-contacting and are spaced apart from one another when the female terminal is not sandwiching (squeezing) the male terminal. According to this second aspect of the disclosure, the female terminal and the sandwiching-wall parts are configured such that they become non-contacting and spaced apart from each another when the terminal parts are not sandwiching the male terminal. Because of this configuration, when the case-cover part is connected to the case main body, the female terminal does not make contact with the sandwiching-wall parts of the case-cover part during assembly and joining. This improves the ease of assembly of the case main body and the case-cover part and provides other benefits from a manufacturing standpoint.

In addition, in a power-tool battery pack according to a third aspect of the disclosure, the female terminal preferably comprises a support-seat part coupled to the battery main body, terminal parts configured to sandwich (squeeze) the male terminal, and support-frame parts continuously connecting (unitarily formed with) the support-seat part and the terminal parts. The abutting-support parts of the female terminal are provided on the support-frame parts. Because the abutting-support parts are provided on the support-frame parts, and the support frame parts continuously (unitarily) connect the support-seat part and the terminal parts, the terminal parts that sandwich the male terminal are satisfactorily supported. In addition, supporting the terminal parts via the support-frame parts makes it possible to provide some margin (tolerance) in the sandwiching of the male terminal by the terminal parts, in other words, to allow for variations in the size of the male terminal and/or the size and shape and placement of the female terminal. This arrangement makes it possible to ensure an easy insertion of the male terminal into the female terminal and an easy mounting of the battery pack onto the tool main body.

In addition, in a power-tool battery pack according to a fourth aspect of the disclosure, portions of the abutting-support parts proximate to the support-seat part are preferably made or configured to correspond to the extension range of (have similar dimensions as) the support-seat part. Thus in each abutting-support part, the location proximate to the support-seat part is made to correspond to the range over which the support-seat part extends, that is, to have generally the same length as the support-seat part in the front-back direction. At the same time, the range over which the abutting-support part is provided is set such that it becomes smaller as it goes toward the terminal parts, that is, the length of the abutting-support part in the front-rear direction decreases in the bottom to top direction. This allows for better inward and outward movement at the terminal parts and increases the ease with which the male terminal can be inserted into the female terminal. Accordingly, the ease with which the battery pack is mounted to the tool main body can be maintained.

In addition, in a power-tool battery pack according to a fifth aspect of the disclosure, the abutting-support parts preferably are bulged toward the facing (immediately adjacent) sandwiching-wall parts more than the terminal parts are. In such a design or configuration, only the abutting-support parts can easily touch the sandwiching-wall parts. Using this design or configuration, the abutting-support parts can be made to touch (contact) the sandwiching-wall parts, and the sandwiching (squeezing) load of the female terminal that sandwiches (squeezes) the male terminal can be maintained at an appropriate load without the provision of any additional elements.

In addition, in a power-tool battery pack according to a sixth aspect of the disclosure, the sandwiching-wall parts preferably each extend in attachment-detachment sliding directions such that each demarcates an outer perimeter of the female terminal. In such a design or configuration, the electrically insulating properties of the outer perimeter of the female terminal can be increased in order to better prevent short circuits in the power-tool battery pack.

In addition, in a power-tool battery pack according to a seventh aspect of the disclosure, the location of the sandwiching-wall part contacted by the abutting-support part is preferably provided with a contact-rib part that is bulged (bulges) toward (extends toward) the female terminal. In such a design or configuration, the contact-rib part is provided where the sandwiching-wall part touches (contacts) the abutting-support part. The contact-rib part bulges (extends) toward the female terminal, and therefore only the abutting-support part can easily touch (contact) the sandwiching-wall part and can do so more accurately. In this manner, the abutting-support part can be made to touch the sandwiching-wall part more accurately without the provision of any additional elements.

In addition, in a power-tool battery pack according to an eighth aspect of the disclosure, the battery main body preferably comprises a battery cell and a circuit board, the circuit board extends in the attachment-detachment sliding directions, the terminal parts of the female terminal extend in the attachment-detachment sliding directions, and the female terminal and the support-frame part extend in directions orthogonal to the attachment-detachment sliding directions. In such a design or configuration, the terminal parts can easily bend such that they track the sandwiching of the male terminal as it slides during attachment and detachment. Furthermore, the support-frame parts can reduce bending of the female terminal during the sandwiching of the male terminal and can increase the contact load (force) that the female terminal imparts (applies) to the male terminal. In this manner, the sandwiching load applied by the female terminal that sandwiches the male terminal can be maintained at an appropriate load even when slight design changes to the female terminal are made.

In addition, in a power-tool battery pack according to a ninth aspect of the disclosure, locations of the support-frame part that are adjacent to the support-seat part are preferably configured such that they extend in the attachment-detachment sliding directions, and locations of the abutting-support parts that are adjacent to the support-seat part are configured such that they extend in the attachment-detachment sliding directions. In such a design or configuration, the support-frame part extends in the attachment-detachment sliding directions, and therefore the support force received by the support-frame part from the support seat part is increased. In addition, because the abutting-support part also extends in the attachment-detachment sliding directions, the abutting-support part can increase the support force received by the male terminal from the sandwiching-wall part.

In addition, in a power-tool battery pack according to a tenth aspect of the disclosure, the female terminal is preferably configured such that it is symmetric with respect to the sandwiched male terminal, and therefore the sandwiching (squeezing) of the male terminal by the female terminal is matched on both sides and can be balanced. In this design or configuration, the contact load that the female terminal imparts to the male terminal can be balanced and increased.

In addition, in a power-tool battery pack according to an eleventh aspect of the disclosure, end edges of the support-frame parts preferably are folded in a direction that intersects the attachment-detachment sliding directions, and this increases the stiffness of the support-frame parts. This design or configuration allows the contact load that the female terminal imparts (applies) to the male terminal to be increased further, and the sandwiching load applied by the female terminal that sandwiches (squeezes) the male terminal can be maintained at an appropriate load even after slight design changes to the female terminal.

Additional aspects, features, embodiments and advantages of the present teaching will be better understood after reading the following detailed description and appended claims in connection with the attached drawings.

BRIEF DESCRIPTION OF THE DRAWINGS

FIG. 38 is a plan view of the conventional terminal component of FIG. 37.

DETAILED DESCRIPTION

First Embodiment

Figure 1:
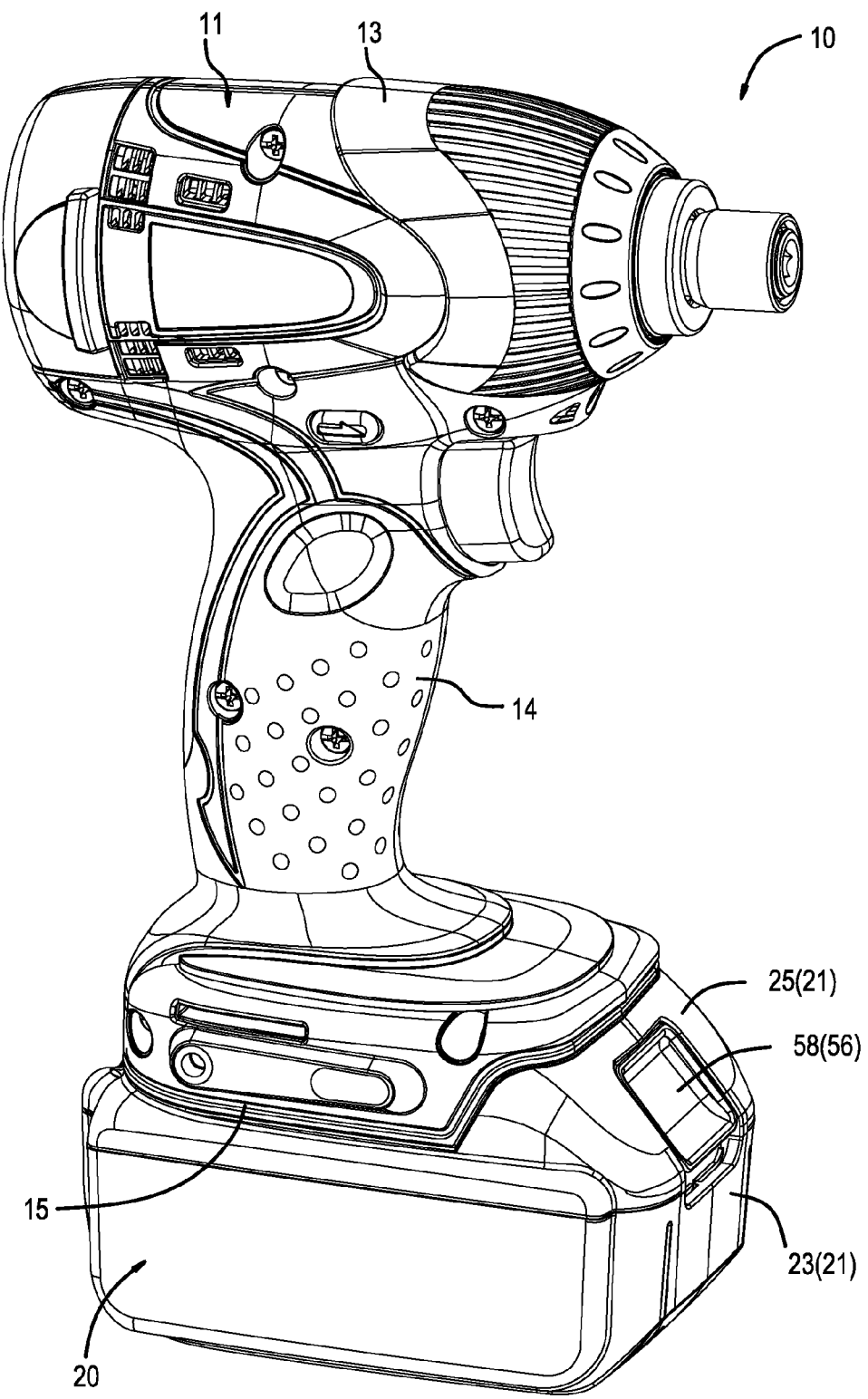
FIG. 1 is an exterior oblique view of an impact driver to which a battery pack is mounted.

The text below describes various embodiments of a power-tool battery pack according to the present disclosure, with reference to the drawings. First, a first embodiment will be explained. Reference numeral 10 shown in FIG. 1 identifies an impact driver that serves as one representative, non-limiting example of a power tool according to the present disclosure. The impact driver 10 includes a battery pack 20 mounted to a tool main body 11 for powering the impact driver 10. The battery pack 20 corresponds to the power-tool battery pack according to the present disclosure and, as the power supply of the impact driver 10, is capable of being attached to and detached from the tool main body 11 of the impact driver 10. That is, when the battery charge becomes too low, the battery pack 20 is detached from the tool main body 11 and then mounted onto (electrically connected to) a specialized charger for recharging. In addition, when charging is complete, the battery pack 20 is once again mounted onto (electrically connected to) the tool main body 11 and serves as the power supply of the power tool, such as the impact driver 10. Furthermore, the tool main body 11 comprises a drive part 13 and a grip part 14, as well as a battery-mount part 15, which is described next in detail.

Figure 2:
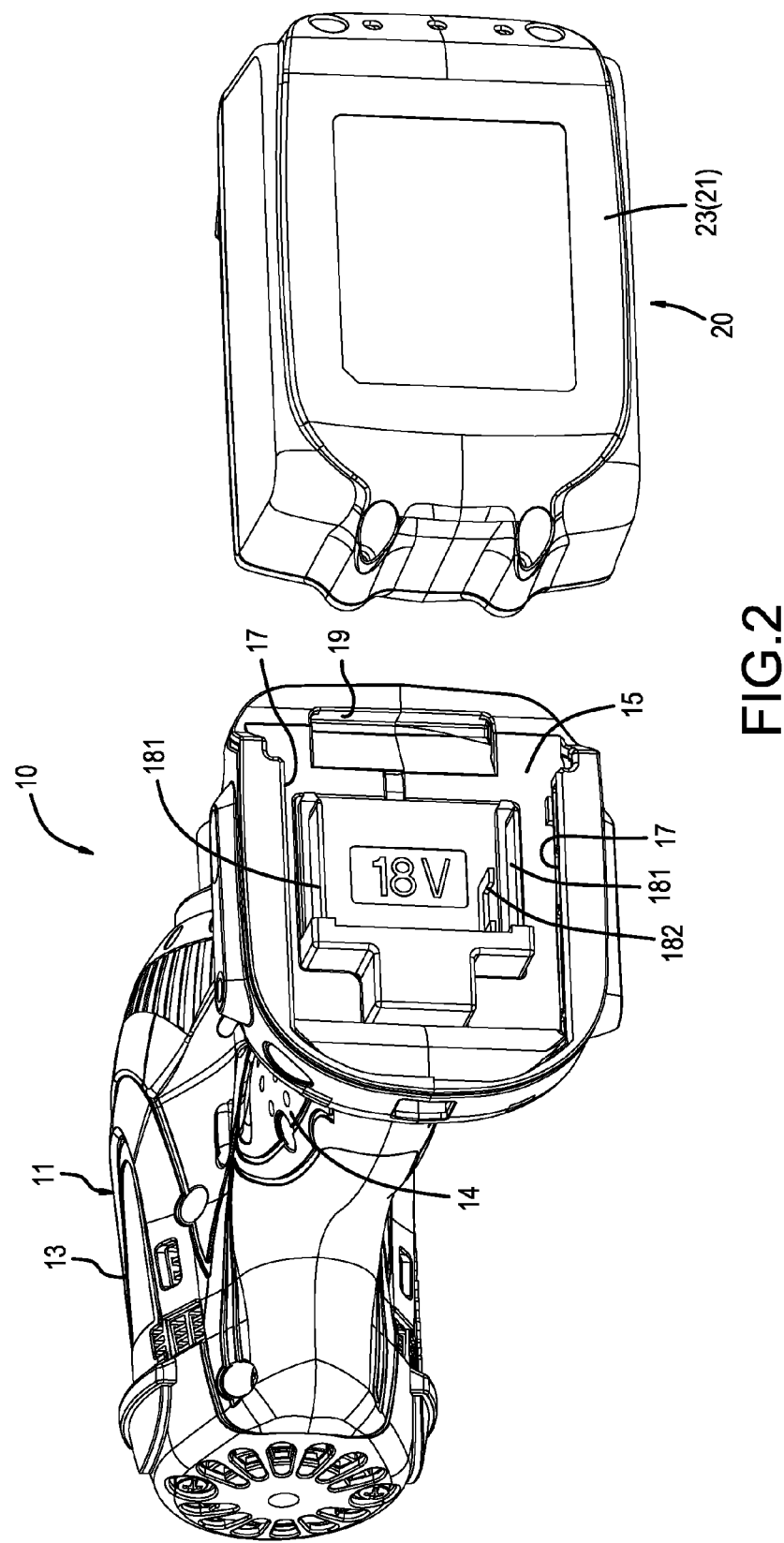
FIG. 2 is an exterior oblique view of the impact driver of FIG. 1 with the battery pack detached from a tool main body of the impact driver.
Figure 3:
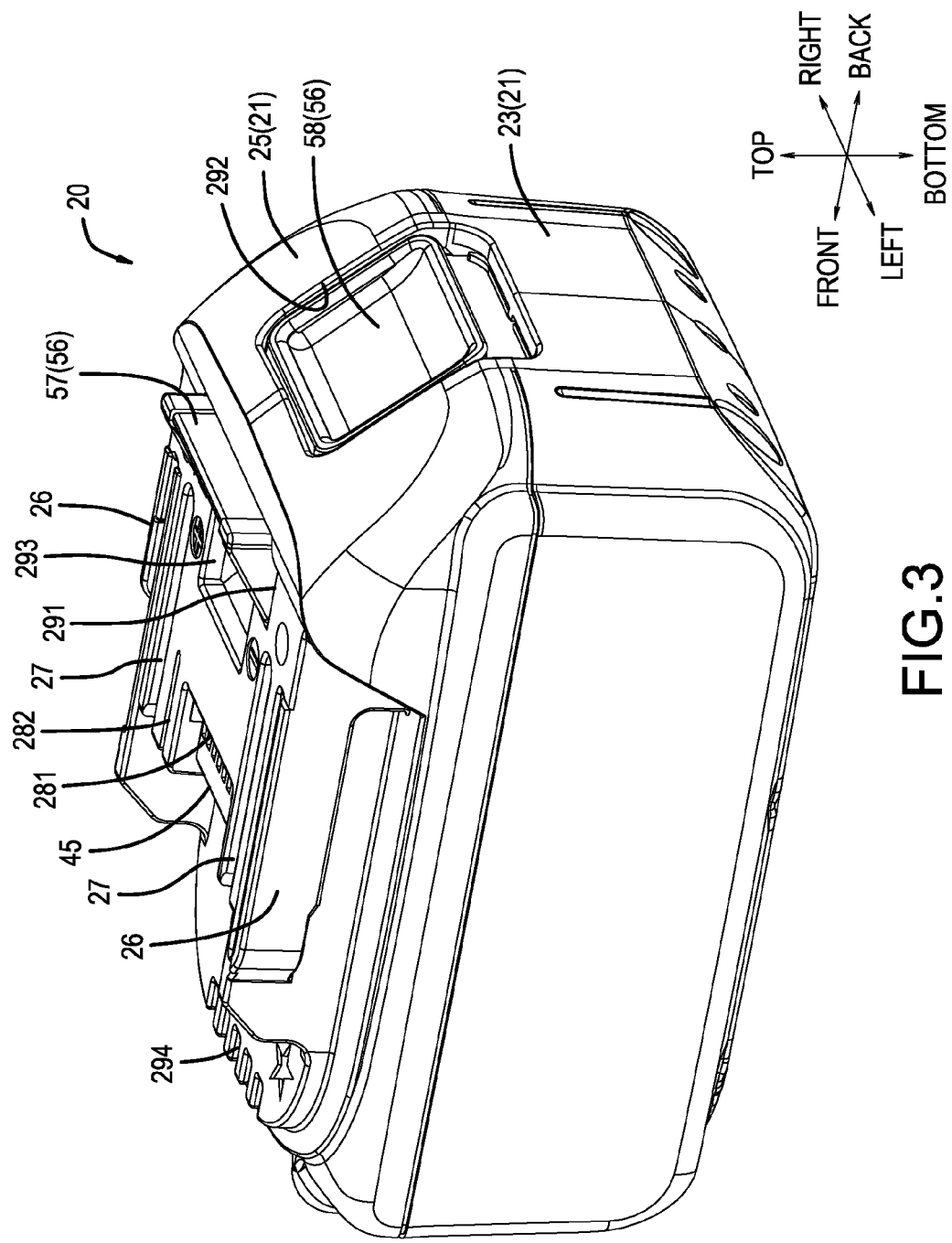
FIG. 3 is an exterior oblique view of the battery pack.
Figure 4:
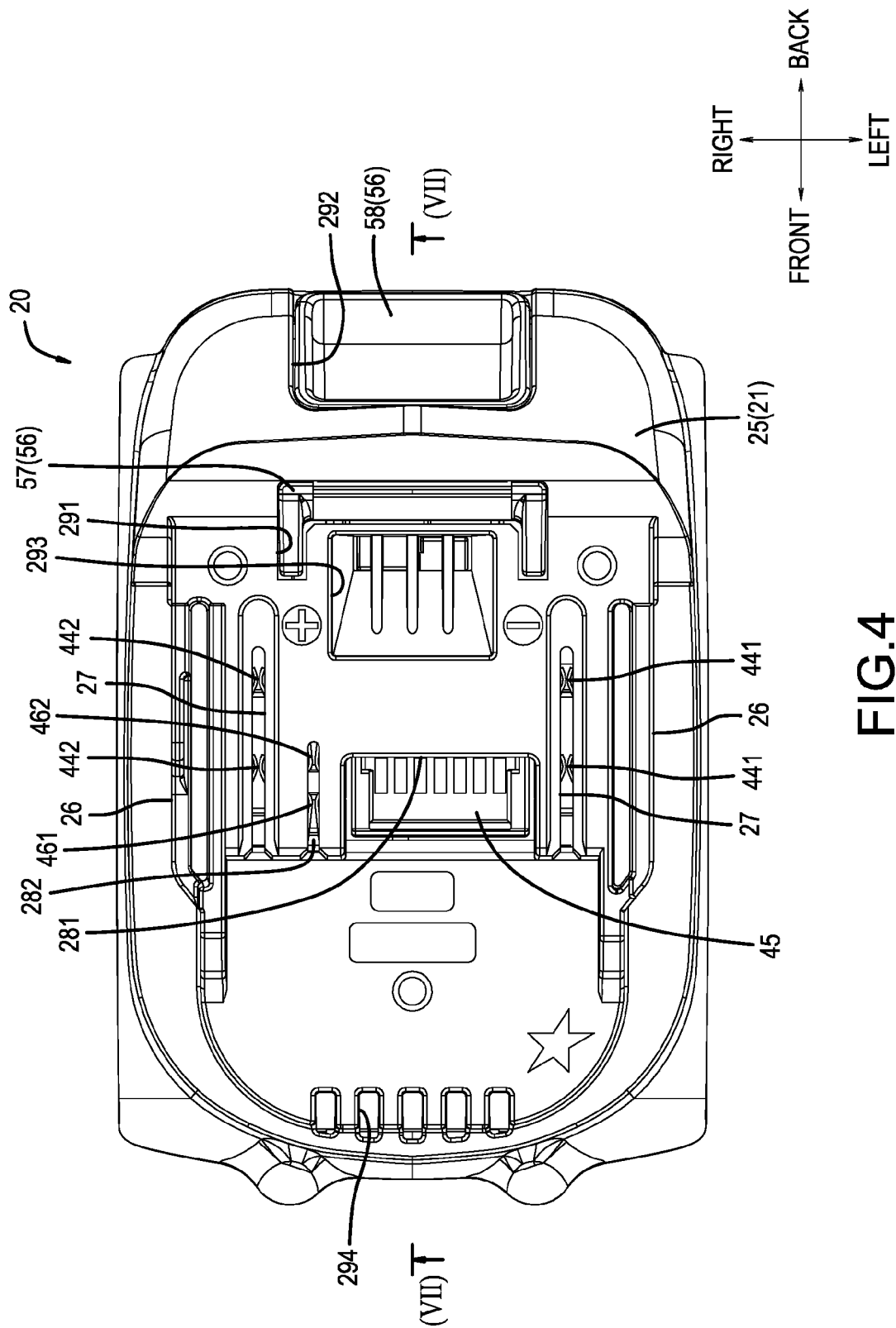
FIG. 4 is a plan view that shows an upper surface of the battery pack.
Figure 5:
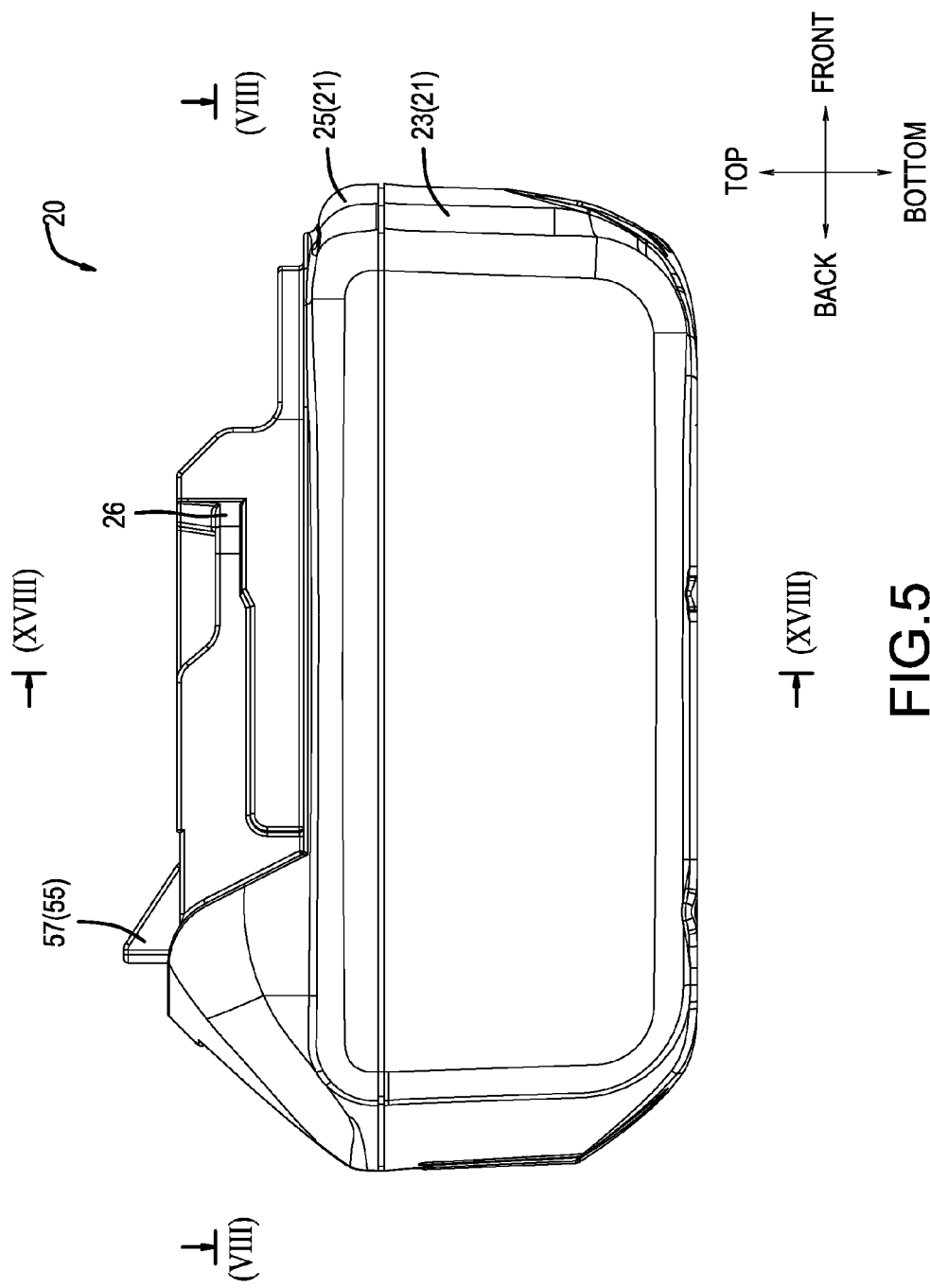
FIG. 5 is a side elevational view of the battery pack.

The oblique view in FIG. 2 shows a back side of the tool main body 11 with the battery pack 20 detached from the tool main body 11. The battery-mount part 15 is provided on or towards the back side of a lower part of the tool main body 11. The battery-mount part 15 is configured for slidably receiving the slide-mount-type battery pack 20. That is, the battery-mount part 15 has a structure that allows the battery pack 20 to be slidably mounted to or detached from the tool main body 11. Specifically, the battery-mount part 15 is provided with: (i) rails 17 that guide the sliding of the battery pack 20, (ii) connection terminals 181 connected to terminals on the battery pack 20 by the sliding, (iii) a communication terminal 182 connected to a terminal on the battery pack 20 by the sliding, and (iv) a mating female part 19 that mates (engages) with a hook part (hook) 57 on the battery pack 20.

Next, the battery pack 20 mounted to the battery-mount part 15 will be explained. Furthermore, the connection terminals 181 correspond to male terminals according to the present disclosure. That is, the connection terminals 181 are the male terminals of the counterpart-side tool main body 11 to which the battery pack 20 is mounted by sliding. The connection terminals 181 are formed as flat-plates that extend in the sliding directions.

In the following explanation of the battery pack 20, the side of the battery pack 20 facing the battery-mount part 15 when the battery pack 20 is mounted to the battery-mount part 15 is defined as the upper side, and the front side of the battery pack 20 when the battery pack 20 is moving in the sliding direction as it is mounted to the battery-mount part 15 by sliding is defined as the front side of the battery pack 20. As shown in FIG. 3 through FIG. 7, the battery pack 20 substantially comprises a case 21, a battery main body 30 mounted inside the case 21, and a male-hook mechanism 55 for retaining the battery pack 20 on the battery-mount part 15 after slide mounting. The case 21 functions as a casing that houses the battery main body 30 and forms the outer packaging of the battery pack 20. The case 21 is formed from an upper part and a lower part and assembled by uniting (joining), in the up-down directions, a case main body 23 and a case-cover part 25. The case main body 23 and the case-cover part 25 thus united are held together by screw members 22. The case 21 forms a box (hollow) space in which the battery main body 30 can be installed.

Figure 6:
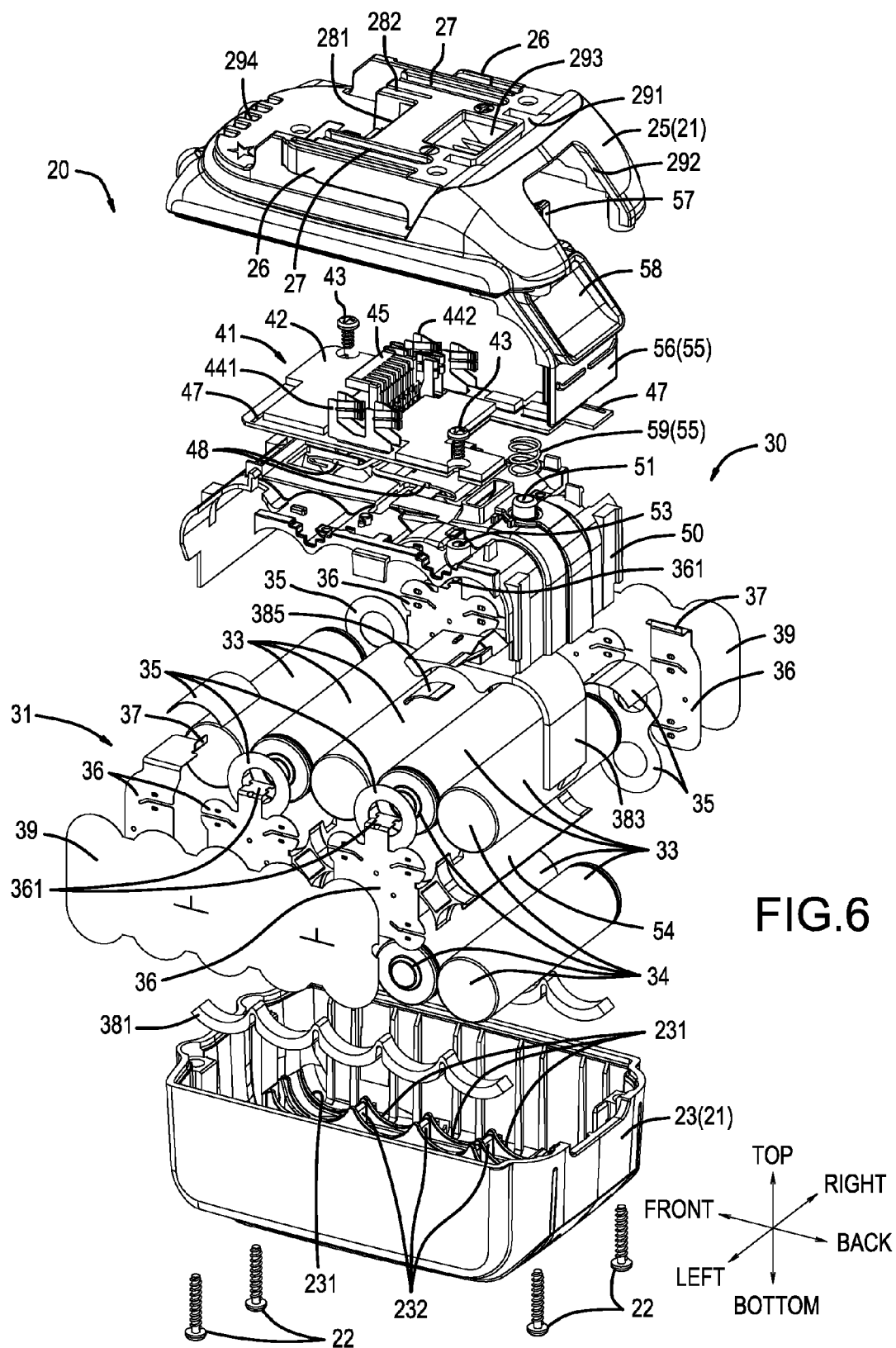
FIG. 6 is an exploded oblique view that shows the internal structure of the battery pack.
Figure 7:
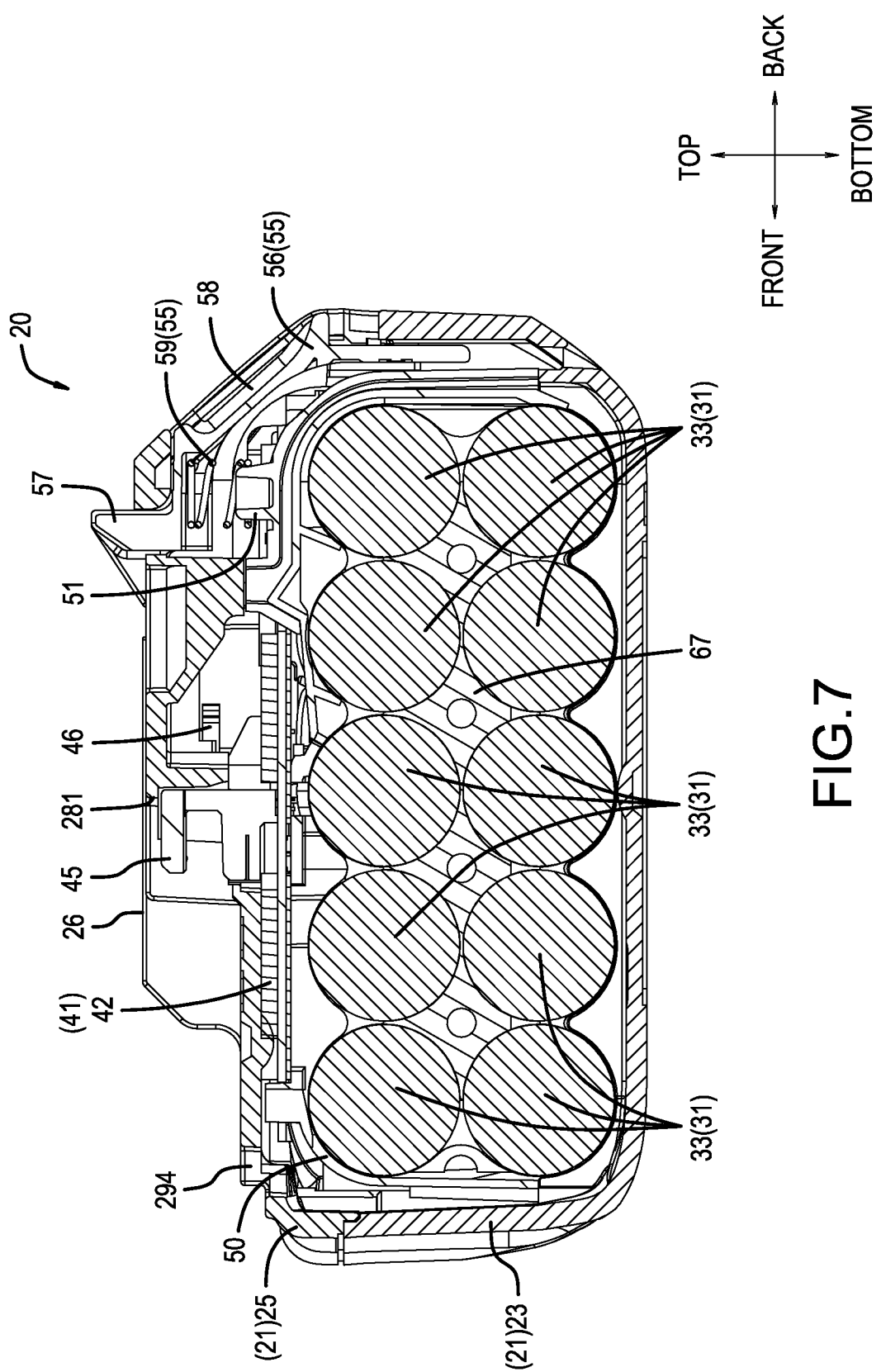
FIG. 7 is a cross-sectional side (auxiliary) view taken along line (VII)-(VII) in FIG. 4.
Figure 8:
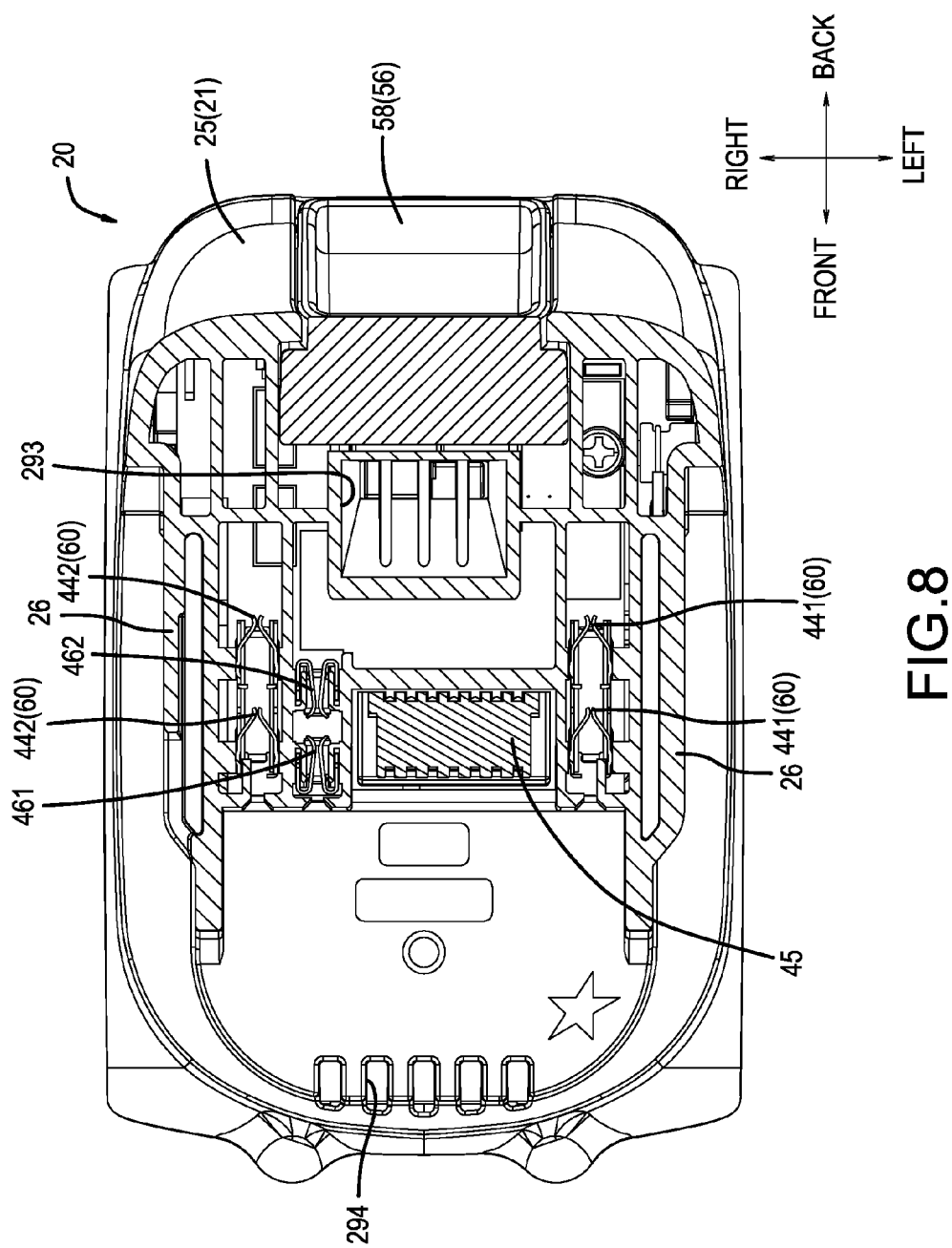
FIG. 8 is a cross-sectional plan (auxiliary) view taken along line (VIII)-(VIII) in FIG. 5.
Figure 9:
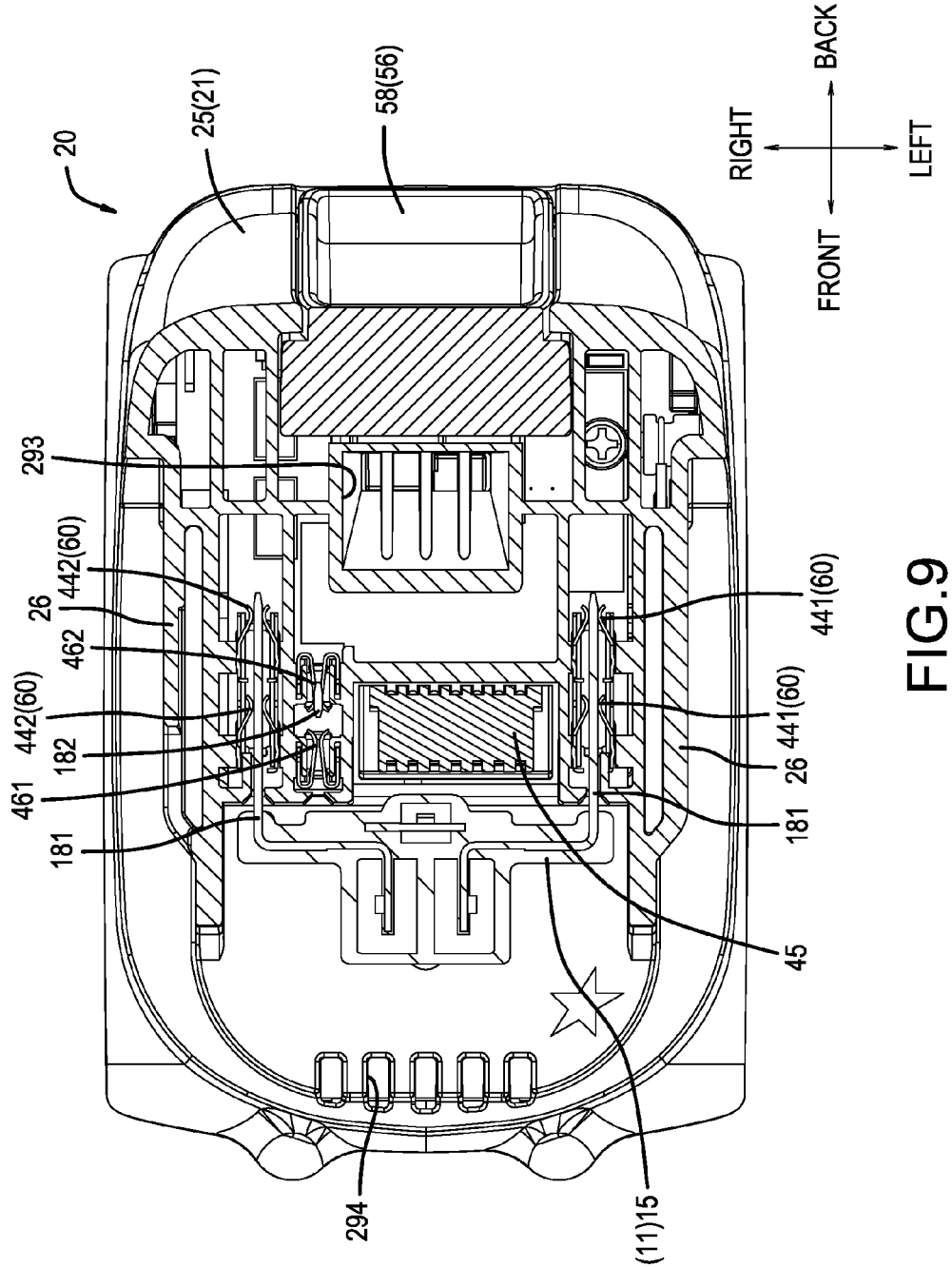
FIG. 9 is a cross-sectional view that shows the battery pack in FIG. 8 when it has been mounted onto the tool main body.

As shown in FIG. 6 and FIG. 7, the case main body 23 is approximately box shaped with an open upper surface and houses the principal portions of the battery main body 30. The case main body 23 principally houses a battery part 31 of the battery main body 30, which will be explained further below. Specifically, the case main body 23 is formed such that its dimensions in the front-rear, left-right, and up-down directions are sufficient to house or accommodate a total of ten battery cells 33 on two levels in the up-down direction with five battery cells 33 in each level arranged in a row in the front-rear direction. Furthermore, a circuit board 42 of the battery main body 30 protrudes upward from the case main body 23 and is configured to be housed inside the case-cover part 25. The case-cover part 25 constitutes the outer packaging on the connection side when the battery pack 20 is slidably mounted onto the apparatus main body (i.e. the tool main body 11 of the impact driver 10, the specialized charger, or the like). Sliding-guide parts 26 are provided at intermediate portions of the case-cover part 25 and are guided by the rails 17. The mounting of the tool main body 11 of the battery pack 20 onto the battery-mount part 15 by sliding is guided by the sliding-guide parts 26, which are guided by the rails 17.

In addition, the case-cover part 25 is provided with slits 27 for enabling an electrical connection between the connection terminals 181 on the battery-mount part 15 side and ground terminals 441 and discharge terminals 442, which are described in detail hereinafter. The slits 27 correspond to female openings according to the present disclosure and are capable of receiving the above-mentioned connection terminals 181 directed toward the interior of the case 21. The case-cover part 25 is provided with an opening 281 and a slit 282 for enabling a communication connector 45, a charging terminal 461, a communication terminal 462, and the like, which are explained hereinafter, to electrically connect to a communication terminal and a charging terminal (not shown) on the specialized-charger side, the communication terminal 182 of the tool main body 11, and the like. In addition, the case-cover part 25 is provided with a hook opening 291 and an operation opening 292 for the male-hook mechanism 55. In addition, the case-cover part 25 is provided with ventilation ports 293, 294 for cooling the battery cells 33 inside the case 21 when it is mounted to the specialized charger (not shown) and is being charged. Furthermore, the case main body 23 and the case-cover part 25 are integrally screwed together and are tightly secured to one another by the screw members 22, thereby forming the case 21.

In addition, the male-hook mechanism 55 has a structure such that when the battery pack 20 has been mounted to the battery-mount part 15 by sliding, the battery pack 20 detachably mates with the battery-mount part 15. That is, as shown in FIG. 6 and FIG. 7, the male-hook mechanism 55 comprises a hook-shaped structural body 56 and a compression spring 59 that urges the hook-shaped structural body 56 in a latching direction. The hook-shaped structural body 56 comprises the hook-shaped hook part 57 mated to the mating female part 19 and an operable finger-catching-shaped operating part 58. The thus configured male-hook mechanism 55 automatically mates the hook part 57 to the mating female part 19 of the battery-mount part 15 by the urging force of the compression spring 59. In addition, when the operating part 58 is pulled down against the urging force of the compression spring 59, the mating of the hook part 57 to the mating female part 19 of the battery-mount part 15 can be released and the battery pack 20 can be detached from the tool main body 11 by sliding. Furthermore, the compression spring 59 is fitted onto and thereby held by a protruding-column part 51 that protrudes from an upper surface of a cell holder 50.

Next, the battery main body 30 mounted inside the above-mentioned case 21 will be described. As shown in FIG. 6, the battery main body 30 comprises the battery part 31 and a control part 41. The battery part 31 has a total of ten of the battery cells 33 on two levels in the up-down direction with five battery cells 33 in each level arranged in a row in the front-rear direction. The battery cells 33 may be widely used rechargeable battery cells and, specifically, may comprise, e.g., lithium-ion batteries. The ten battery cells 33 are transversely disposed with their longitudinal axes extending in the left-right direction and are arranged in a row in the front-rear direction. In addition, a separator 54 is interposed between the five battery cells 33 of the upper level and the five battery cells 33 of the lower level. Thus, the electrodes 34 of the ten battery cells 33, which are held by the cell holder 50 and the separator 54, are located on both their left and right side ends.

Insulating sheets 35 for preventing undesired electrical conductivity are attached to the positive electrodes of the battery electrodes 34. Lead plates 36 that electrically-connect electrodes having the same electric potential to one another are attached to the electrodes 34 of the battery cells 33. Connection-end parts 37 connectable to the circuit board 42 are provided on the front-left side and the rear-right side lead plates 36. The connection-end parts 37 are connected to connection parts 47 of the circuit board 42. In addition, insulating sheets 39 for preventing undesired electrical conductivity are attached to outer sides of the lead plates 36.

The control part 41 is disposed on the upper side of the above-mentioned battery cells 33 (the battery part 31) and comprises the circuit board 42, which performs (executes) various control processes. The circuit board 42 is equipped with a microcontroller (e.g., including a microprocessor and a memory), and it monitors the state of the battery cells 33 via the lead plates 36 and e.g., controls the charging and discharging of the battery cells 33. Consequently, upper-end portions 361 of the lead plates 36 are electrically connected to the circuit board 42 via lead wires 48.

The circuit board 42 extends in the attachment-detachment sliding directions (the directions in which the battery pack 20 is attached to and detached from the battery-mount part 15, respectively). In addition, the upper surface of the circuit board 42 is provided with the ground terminals 441, the discharge terminals 442, the communication connector 45, the charging terminal 461, and the communication terminal 462. The ground terminals 441, the discharge terminals 442, the communication connector 45, the charging terminal 461, and the communication terminal 462 are configured as terminals that are electrically connectable to the tool main body 11 (the battery-mount part 15), the specialized charger, or the like. Furthermore, signals sent and received via the communication connector 45 and the communication terminal 462 are based on the control processes executed by the circuit board 42. Optionally, the circuit board 42 may be configured without the microcontroller that controls the charging and discharging of the battery cells 33.

The circuit board 42 is integrally screwed to and thereby tightly secured to the cell holder 50 via screw members 43, as explained below. That is, the screw members 43 are screwed into threaded openings 53 of the cell holder 50 such that the circuit board 42 is sandwiched (interleaved) therebetween. In addition, reference numerals 381 shown in FIG. 6 identify cushioning (elastic) sheets (strips) that are spread out inside the case main body 23 for housing the battery cells 33 in the case 21. The cushioning sheets 381 are held by arcuate-shaped retaining ribs 231 that are provided on a bottom surface inside the case main body 23 and that form facing pairs of the arcuate-shaped retaining ribs 231. In addition, section ribs 232 that sectionalize the arrangement of the battery cells 33 in the front-rear direction are provided between the arcuate-shaped retaining ribs 231. Each of the arcuate-shaped retaining ribs 231 is formed with (has) an inner circumference that corresponds to the respective outer circumferences of the battery cells 33. In addition, reference numeral 383 denotes a flow plate interposed between the battery cells 33 and the cell holder 50, which will be explained hereinafter. In addition, reference numeral 385 is two-sided tape for affixing a thermistor (not shown) that can be used to monitor the temperature of the battery cells 33.

Although the above-mentioned ground terminals 441 and discharge terminals 442 differ in their locations, their purposes, and the like, they are configured by the attachment of identical terminal components 60 to the circuit board 42. The terminal components 60 that constitute the ground terminals 441 and the discharge terminals 442 will now be explained.

Figure 10:
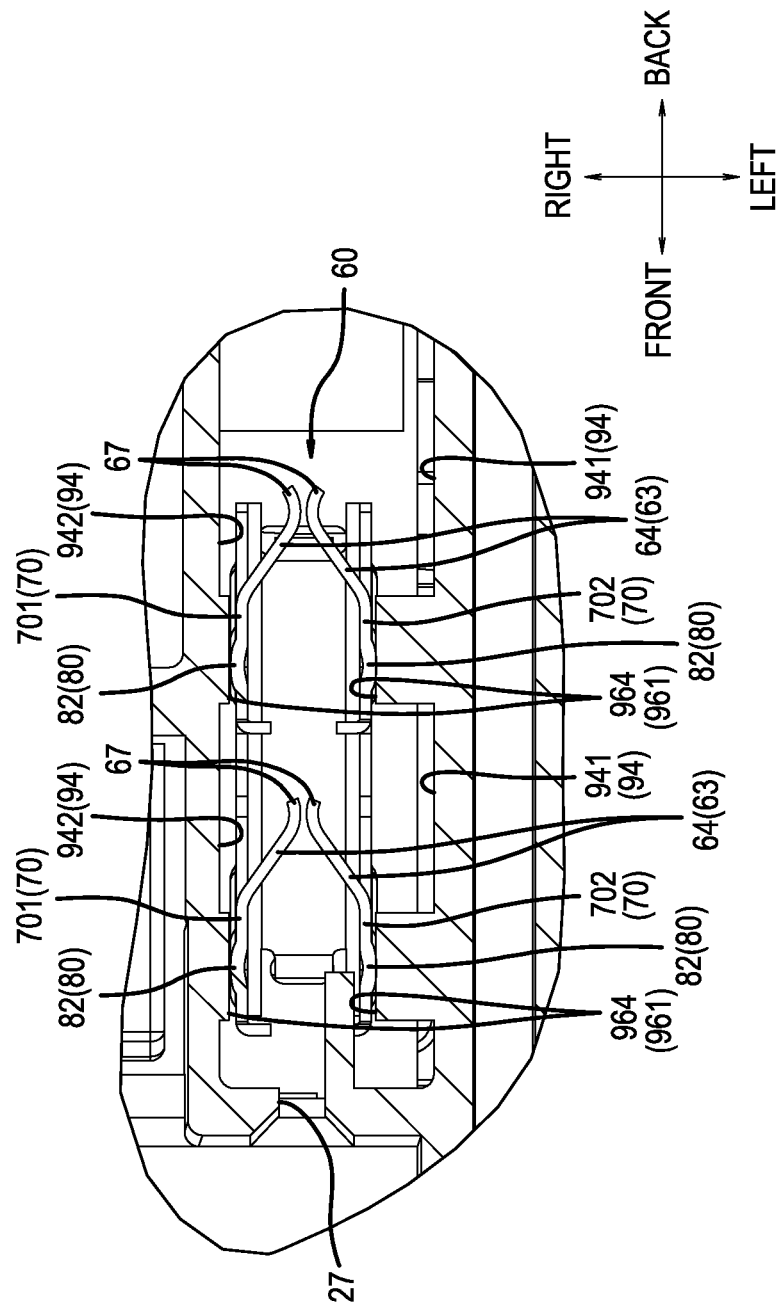
FIG. 10 is a cross-sectional view that shows an enlargement of the locations of ground terminals 441 in FIG. 8.
Figure 11:
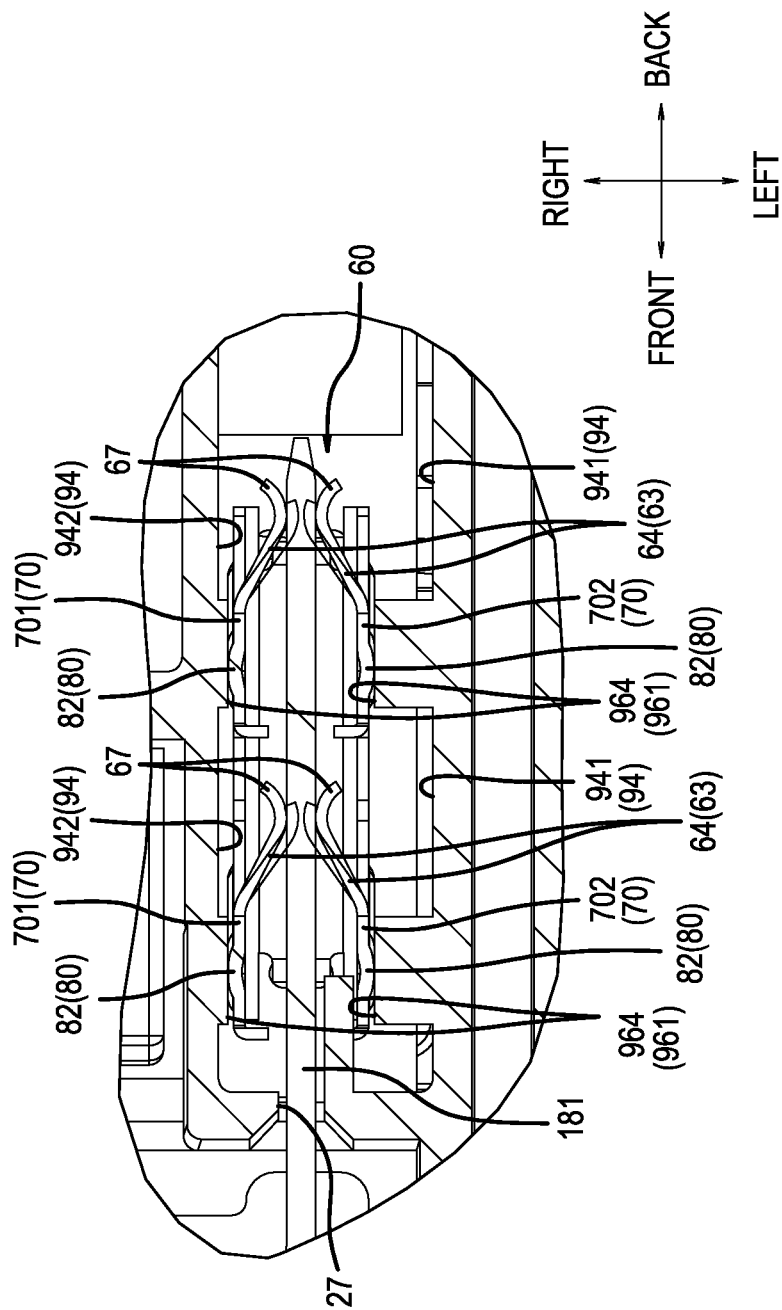
FIG. 11 is a cross-sectional view that shows an enlargement of the locations of the ground terminals 441 in FIG. 9.
Figure 12:
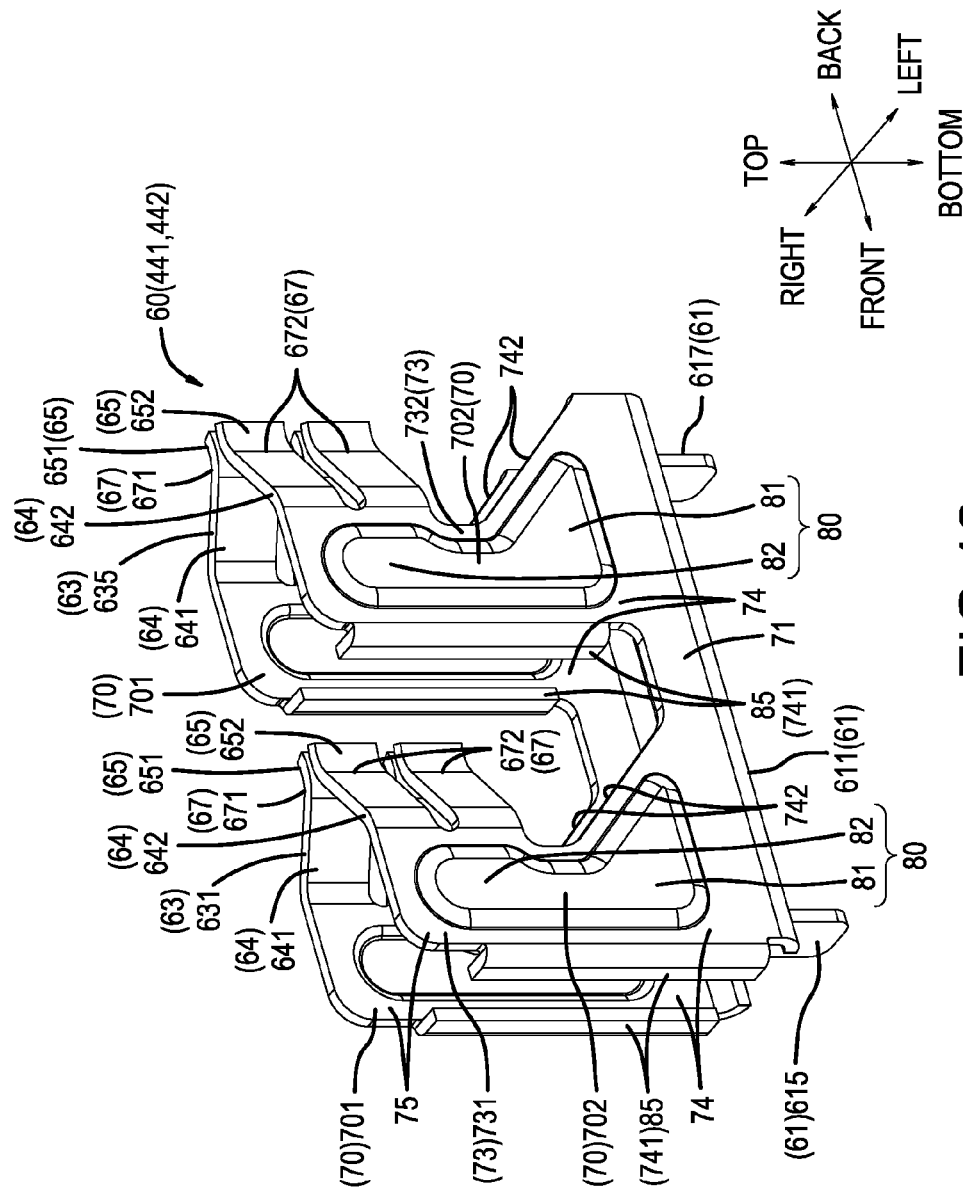
FIG. 12 is an oblique view that shows a front side of a terminal component (terminal).
Figure 13:
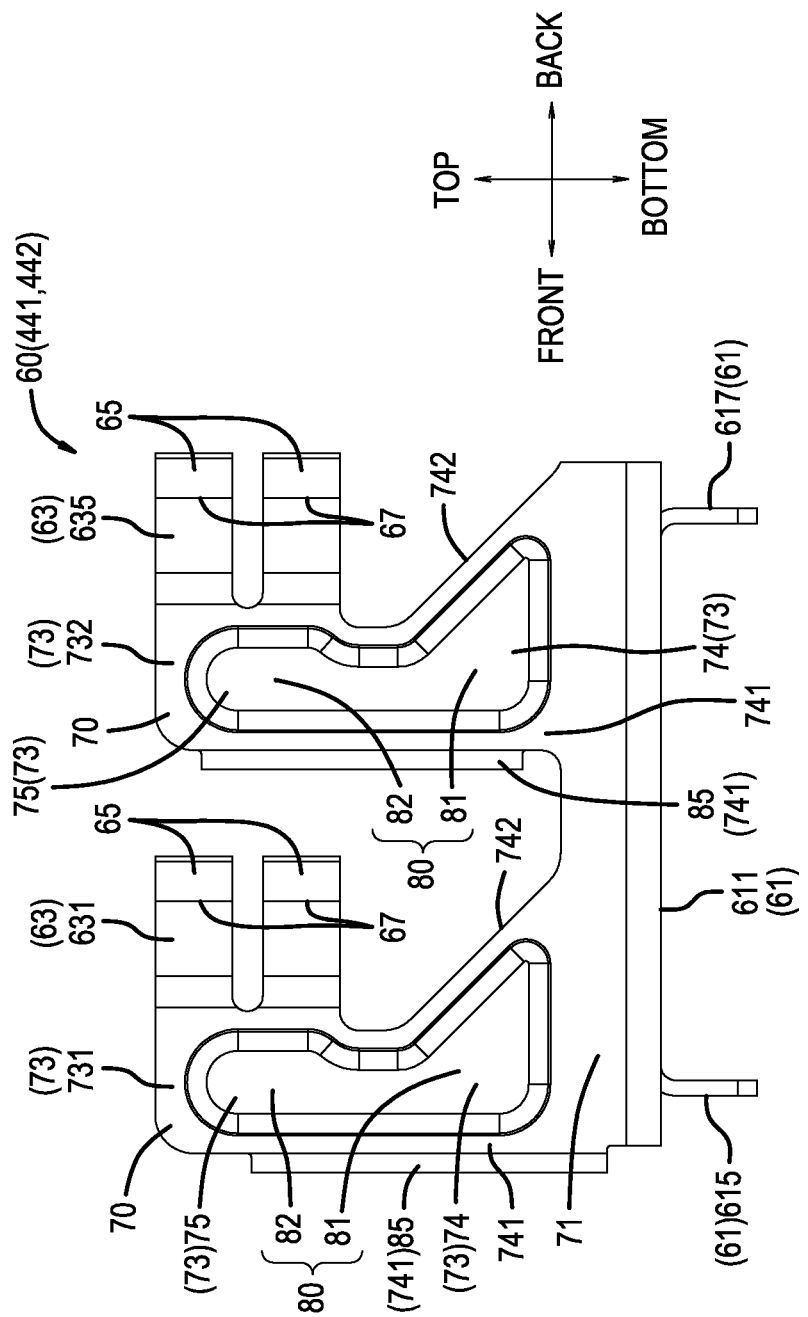
FIG. 13 is a side elevational view of the terminal component of FIG. 12.
Figure 14:
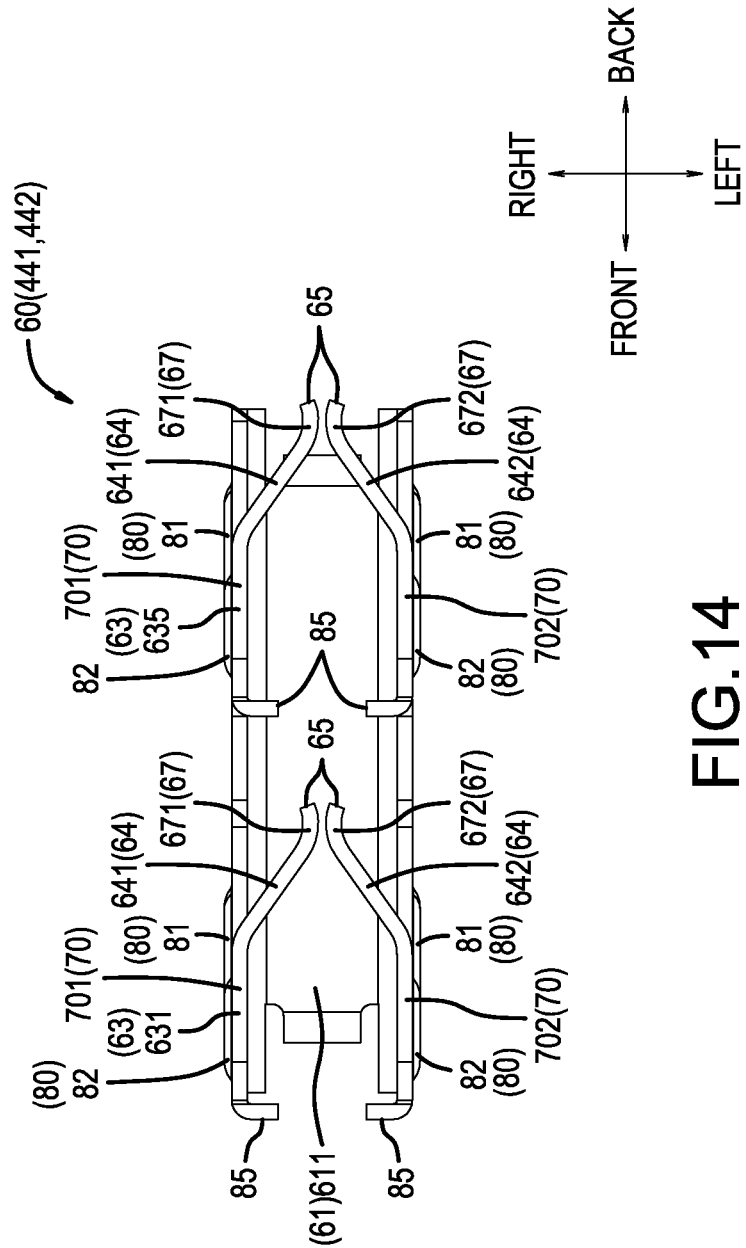
FIG. 14 is a top plan view of the terminal component of FIG. 12.
Figure 15:
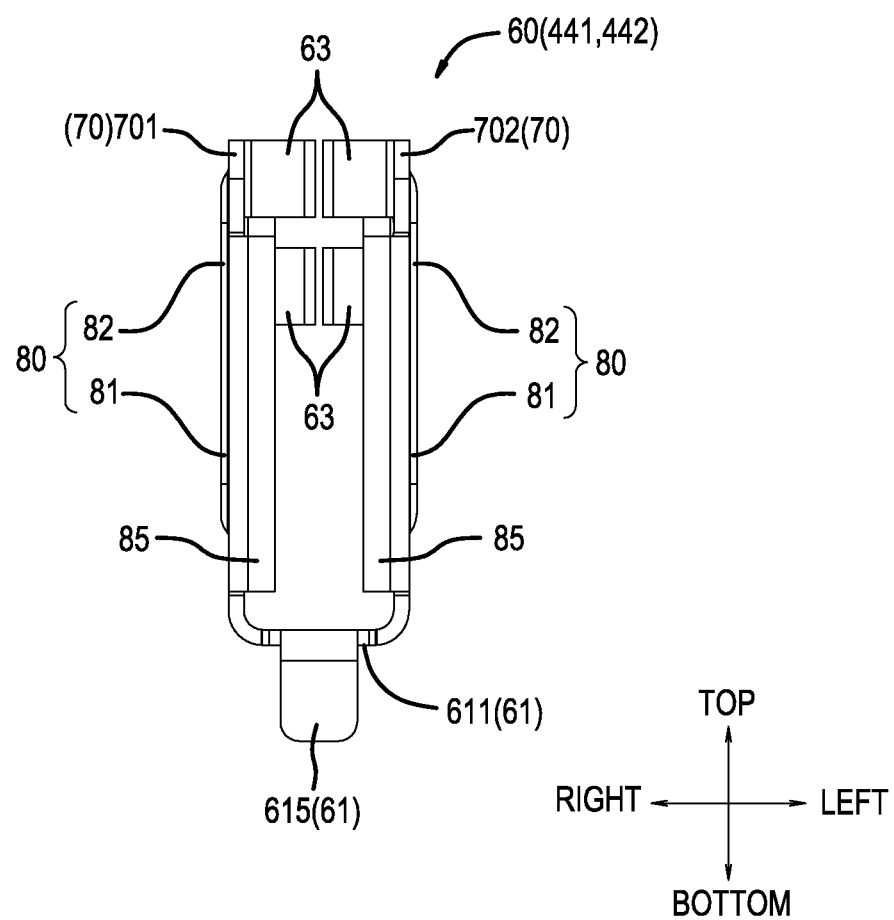
FIG. 15 is a front elevational view of the terminal component of FIG. 12.
Figure 16:
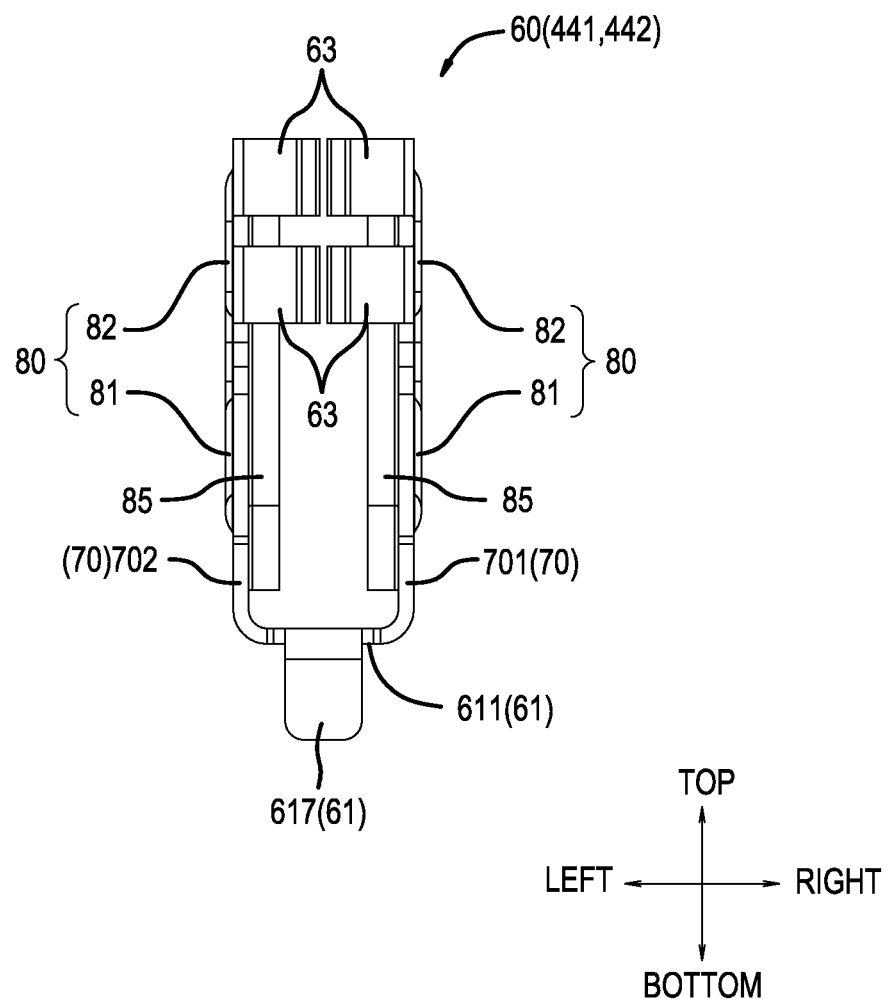
FIG. 16 is a rear elevational view of the terminal component of FIG. 12.
Figure 17:
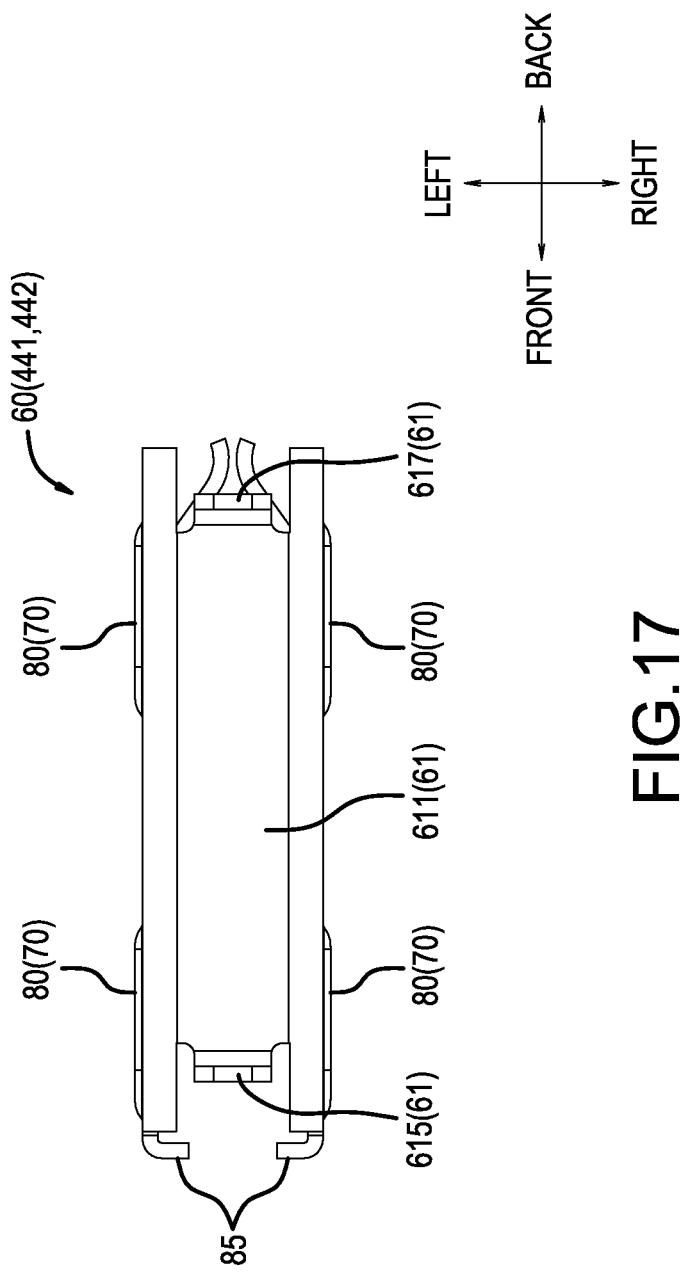
FIG. 17 is a bottom plan view of the terminal component of FIG. 12.

As shown in FIG. 8 through FIG. 17, each terminal component (or simply "terminal") 60 is fabricated by folding a metal plate that has been cut (stamped) to form a predetermined shape. The terminal component 60 constitutes a female terminal that is connectable to a corresponding connection terminal 181, which constitutes the male terminal. More specifically, the terminal component 60 has a female shape (or is a female terminal) that sandwiches (squeezes/presses against) the male connection terminal 181 from both the left and right sides. Furthermore, as shown in FIG. 10 and FIG. 11, the female terminal component 60 receives the male connection terminal 181, which slides from forward to rearward. The connection terminal 181 received by the terminal component 60 is sandwiched by and electrically connected to the terminal component 60 (the ground terminal 441 and the discharge terminal 442). As shown in FIG. 12 through FIG. 17, the terminal component 60 comprises a support-seat part 61, terminal parts 63, and support-frame parts 70. The support-seat part 61, the terminal parts 63, and the support-frame parts 70 are formed such that they are integrally and continuously connected, i.e. such that they are unitary or are formed from a single sheet of material without any seams between the various sections of the terminal component 60. Furthermore, the terminal parts 63 of the terminal component 60 comprise front-side terminal parts 631 and rear-side terminal parts 635 such that the connection terminal 181 is sandwiched (squeezed) at two separate, longitudinally spaced-apart locations—one toward its front side and one toward its rear side. Furthermore, the front-side terminal parts 631 and the rear-side terminal parts 635 are symmetrical pairs with respect to the connection terminal 181 to be sandwiched (squeezed).

The support-seat part 61 is coupled to the circuit board 42 of the battery main body 30 and supports the support-frame parts 70. The support frame parts 70 are continuous with the terminal parts 63. The support-seat part 61 is substantially formed by the continuous connection of a seat body 611 and board-coupling parts 615, 617. The seat body 611 is formed as a flat plate that faces the circuit board 42. The seat body 611 supports the support-frame parts 70, and the support frame parts 70 are continuous with the terminal parts 63. The seat body 611 is formed as a long-plate shape that extends in the front-rear direction such that it supports the front-side terminal parts 631 and the rear-side terminal parts 635, which are arranged in a row (line) forward and rearward, respectively. The board-coupling parts 615, 617 are provided at a front end and a rear end of the seat body 611 and are folded toward the lower side. The board-coupling parts 615, 617 each have a protruding shape capable of sticking (being inserted) into the circuit board 42. The board-coupling parts 615, 617 stuck (fixedly inserted) into the circuit board 42 are coupled to and supported by the circuit board 42 and are electrically joined with the circuit board 42.

The support-frame parts 70 are continuously connected to the support-seat part 61 and to the terminal parts 63. The support-frame parts 70 support the terminal parts 63 while they themselves are supported by the support-seat part 61, and the support seat part 61 is supported by the circuit board 42. The support-frame parts 70 are formed in pairs, one on the left and one on the right, as are the terminal parts 63. Specifically, a right-side support-frame part 701 is provided along a right-side end edge of the support-seat part 61, and a left-side support-frame part 702 is provided along a left-side end edge of the support-seat part 61. Furthermore, the support-frame parts 70 are formed such that, when the terminal component 60 is attached to the circuit board 42, the support-frame parts 70 extend in directions orthogonal to the attachment-detachment sliding directions in which the battery pack 20 is attached to and detached from the battery-mount part 15 (that is, in the top-bottom direction).

Each support-frame part 70 is substantially formed by the continuous connection of an edge body 71 and two column parts 73 (731, 732). The edge bodies 71 are provided on portions of the above-mentioned seat body 611 that constitute the end edges on both left and right sides. The edge bodies 71 protrude toward the upper side from the portions that constitute the end edges of the seat body 611 and are provided such that they extend in the front-rear direction. Each edge body 71 is provided with the front-side column part 731 and the rear-side column part 732 such that they branch corresponding to the front and rear terminal parts 63. The front-side column part 731 and the rear-side column part 732 are arranged in a row forward and rearward with respect to (relative) to the edge body 71 and are formed such that they extend on the upper side of the seat body 611. The front-side column part 731 and the rear-side column part 732 have substantially the same shape. Consequently, in the following explanation, the same reference numerals are used to identify elements of the front-side column part 731 and the rear-side column part 732 (the column parts 73).

The column parts 73 are formed in pairs and face each other, the same as the terminal parts 63. Each column part 73 comprises a column main body 74 continuously connected to the edge body 71 and extending on the upper side of the edge body 71, and a terminal-support part 75 that supports the terminal parts 63 from an upper-end portion of the column main body 74. Each column main body 74 narrows from its lower part, which is continuously connected to the edge body 71, toward its upper part, which is continuously connected to the terminal-support part 75. To explain more specifically or concretely, a front-side end-edge part 741 of the column main body 74 extends in the vertical direction, whereas a rear-side end-edge part 742 of the column main body 74 is tilted (angled) toward the front side in a direction from its lower side to its upper side. Consequently, in a side view, the column main body 74 has an approximate right-triangular shape. The terminal-support part 75 is provided on the upper side of the column main body 74. The terminal-support part 75 is supported by the column main body 74 and itself supports the terminal parts 63, as will be explained in greater detail below. The terminal-support part 75 extends from the column main body 74 toward the upper side and is approximately rectangular in side view. Furthermore, column parts 73 (column main bodies 74 and terminal-support parts 75) that form pairs are parallel to one another.

The terminal parts 63 are continuously connected to the terminal-support parts 75 and are split vertically into two levels that are lined up in a row. Furthermore, because the split shapes of the terminal parts 63 are identical to one another, only the upper-side portions are labeled with reference numerals, and some reference numerals that could be used on the lower-side portions are omitted. Each terminal part 63 extends from its terminal-support part 75 toward the rear side. The terminal parts 63 include the front-side terminal parts 631 and the rear-side terminal parts 635 corresponding to the front-side column parts 731 and the rear-side column parts 732, respectively. The front-side terminal parts 631 and the rear-side terminal parts 635 are lined up in a row forward and rearward and have substantially identical shapes. Consequently, in the following explanation, the front-side terminal parts 631 and the rear-side terminal parts 635, which constitute the terminal parts 63, are both identified using identical reference numerals. The terminal parts 63 also are formed in pairs, one on the left and one on the right, the same as the support-frame parts 70.

A front-side portion of each terminal part 63 is continuously connected to its support-frame part 70, which includes the terminal-support part 75, and is supported by the support-frame part 70. Conversely, a rear-side portion of the terminal part 63 is not continuously connected and is not supported. That is, the terminal part 63 is configured such that it is supported on one side, namely, only on the front side. Consequently, the unsupported rear-side portion of the terminal part 63 easily moves side-to-side in the left-right direction. In other words, the terminal part 63 is formed such that its rear side is flexible and has a spring force (resiliency) owing to it being supported on the front side (the one side). Thus, when sandwiching (squeezing) the connection terminal 181 of the tool main body 11, the spring forces of the terminal parts 63 activate, thereby making it possible to sandwich (squeeze) the connection terminal 181. Furthermore, the terminal parts 63 are formed such that, when the terminal components 60 are attached to the circuit board 42 and constitute the ground terminals 441 and the discharge terminals 442, the terminal parts 63 extend in the attachment-detachment sliding directions with respect to the battery-mount part 15 of the battery pack 20. That is, the terminal parts 63 are formed such that they extend in the attachment-detachment sliding direction, which is orthogonal to the support-frame parts 70, which also extend in a direction orthogonal to the attachment-detachment sliding directions.

Each terminal part 63 substantially comprises a sandwiching-slant part 64 that is continuously connected to the terminal-support part 75 and that extends toward the rear side, and a folded-end part 65 that is also continuously connected on the rear side from the rear end of the sandwiching-slant part 64. The sandwiching-slant parts 64 are formed such that the distance between opposing sandwiching-slant parts 64 narrows or decreases from the front side toward the rear side. Specifically, the right-side sandwiching-slant parts 641 are supported by right-side support-frame parts 701 and are disposed on the right side. Each right-side sandwiching-slant part 641 is tilted (angled or inclined) toward the left side as it goes toward the rear side. In addition, left-side sandwiching-slant parts 642 are supported by the left-side support-frame parts 702 and are disposed on the left side. Each left-side sandwiching-slant part 642 is tilted (angled or inclined) toward the right side as it goes toward the rear side. In this way, the sandwiching-slant parts 641, 642 facing one another are tilted (angled or inclined) toward the inner side (toward one another) and approach one another as they go toward the rear side. In addition, rear-end portions of the sandwiching-slant parts 641, 642 are defined as electrical-contact parts 67 (671, 672). The electrical-contact parts 67 (671, 672) function as electrical contacts when the connection terminal 181 is sandwiched (squeezed/held) between the electrical-contact parts 67 (671, 672). The face-to-face distance between the electrical-contact parts 671, 672 decreases until they nearly contact one another.

The folded-end parts 65 (651, 652) are continuously connected to the rear sides of the sandwiching-slant parts 64 such that the electrical-contact parts 67 (671, 672) serve as boundaries. The folded-end parts 65 are formed such that the ranges (areas) over which the electrical-contact parts 671, 672 contact one another are smooth curved surfaces. Specifically, each folded-end part 65 is gently folded so that it is angled or inclined away from its corresponding sandwiching-slant part 64. That is, the folded-end parts 65 are formed such that their face-to-face distance widens or increases from the front side toward the rear side. Each right-side folded-end part 651 is folded such that it describes or traces an arc (an R shape) toward the right side as it goes toward the rear side. In addition, each left-side folded-end part 652 is folded such that it describes or traces an arc (an R shape) toward the left side as it goes toward the rear side. Thus, the sandwiching-slant parts 641, 642, which face one another, and the folded-end parts 651, 652, which face one another, are symmetric with one another with respect to the connection terminal 181 to be sandwiched. Thus, the electrical-contact parts 67 (671, 672) provided at the rear-end portions of the sandwiching-slant parts 641, 642 possess a spring force and sandwich (squeeze) the connection terminal 181. When the electrical-contact parts 671, 672 are sandwiching (squeezing/holding) the connection terminal 181, the sandwiching-slant parts 641, 642 are strained or deformed (their curvatures are changed), though only to a small degree, toward the outer sides such that they become spaced apart from one another.

Furthermore, abutting-support parts 80 are provided on the support frame parts 70 at locations that face the outer sides of the support-frame parts 70. Although they will be explained in more detail below, the abutting-support parts 80 are defined as (constitute) those parts of the terminal components 60 that face the sandwiching-wall parts 94 of the case-cover part 25. The abutting-support parts 80 are further defined as those parts of the terminal components 60 that are capable of contacting the sandwiching-wall parts 94 of the case-cover part 25 when the connection terminals 181 are sandwiched by (inserted into) the terminal parts 63. Furthermore, the terminal components 60 and the sandwiching-wall parts 94 are configured such that, when the terminal components 60 are not sandwiching (squeezing) the connection terminals 181, the terminal components 60 and the sandwiching-wall parts 94 are not in contact with each other, i.e. they are spaced apart. In other words, when the terminal components 60 are not sandwiching (squeezing) the connection terminals 181, the abutting-support parts 80 provided on the support-frame parts 70 do not contact the sandwiching-wall parts 94 and are spaced apart therefrom. Specifically, when the terminal components 60 are not sandwiching (squeezing) the connection terminals 181, the abutting-support parts 80 and the sandwiching-wall parts 94 face one another across an appropriate clearance (gap).

Figure 18:
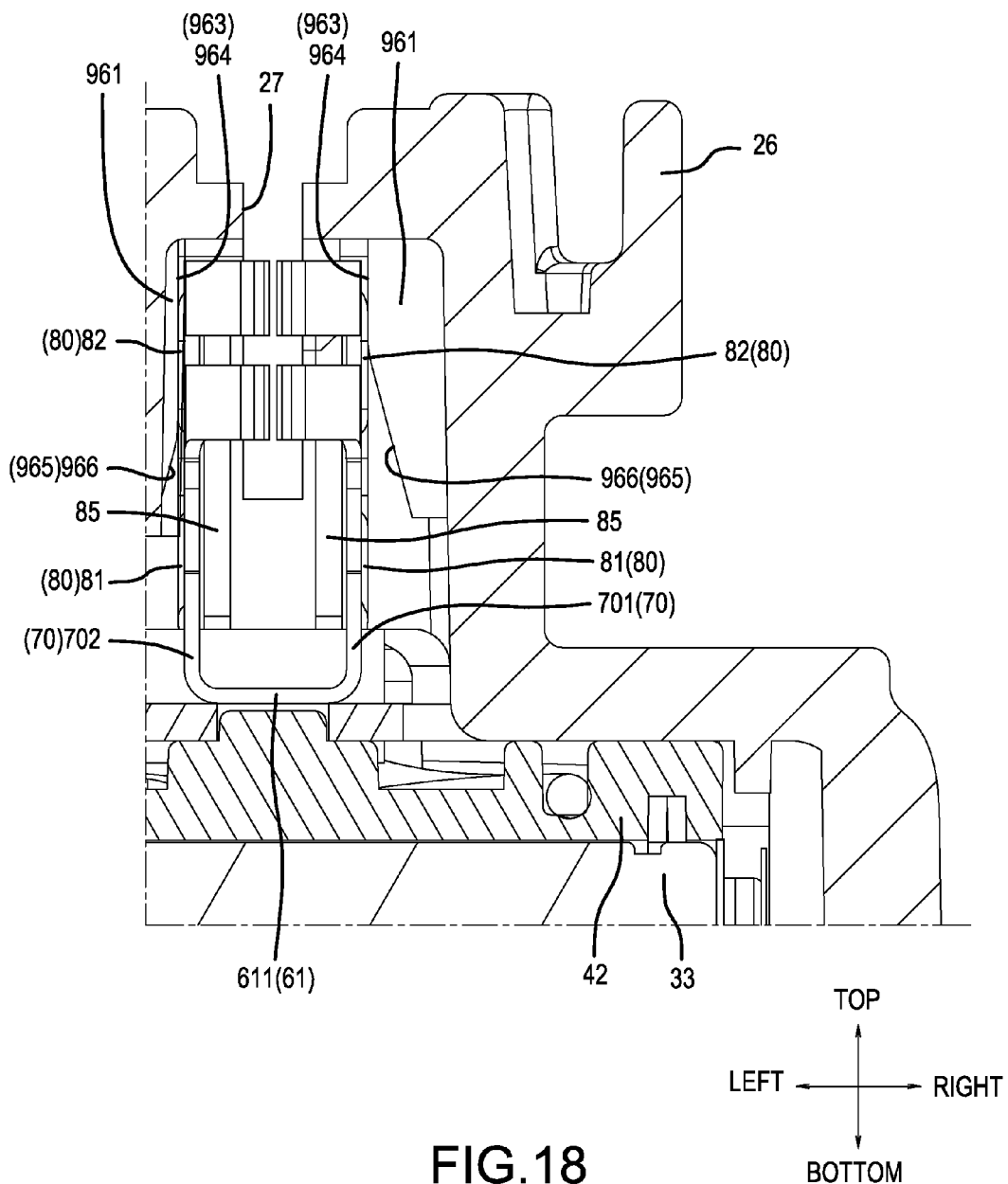
FIG. 18 is a cross-sectional auxiliary view taken along line (XVIII)-(XVIII) in FIG. 5.
Figure 20:
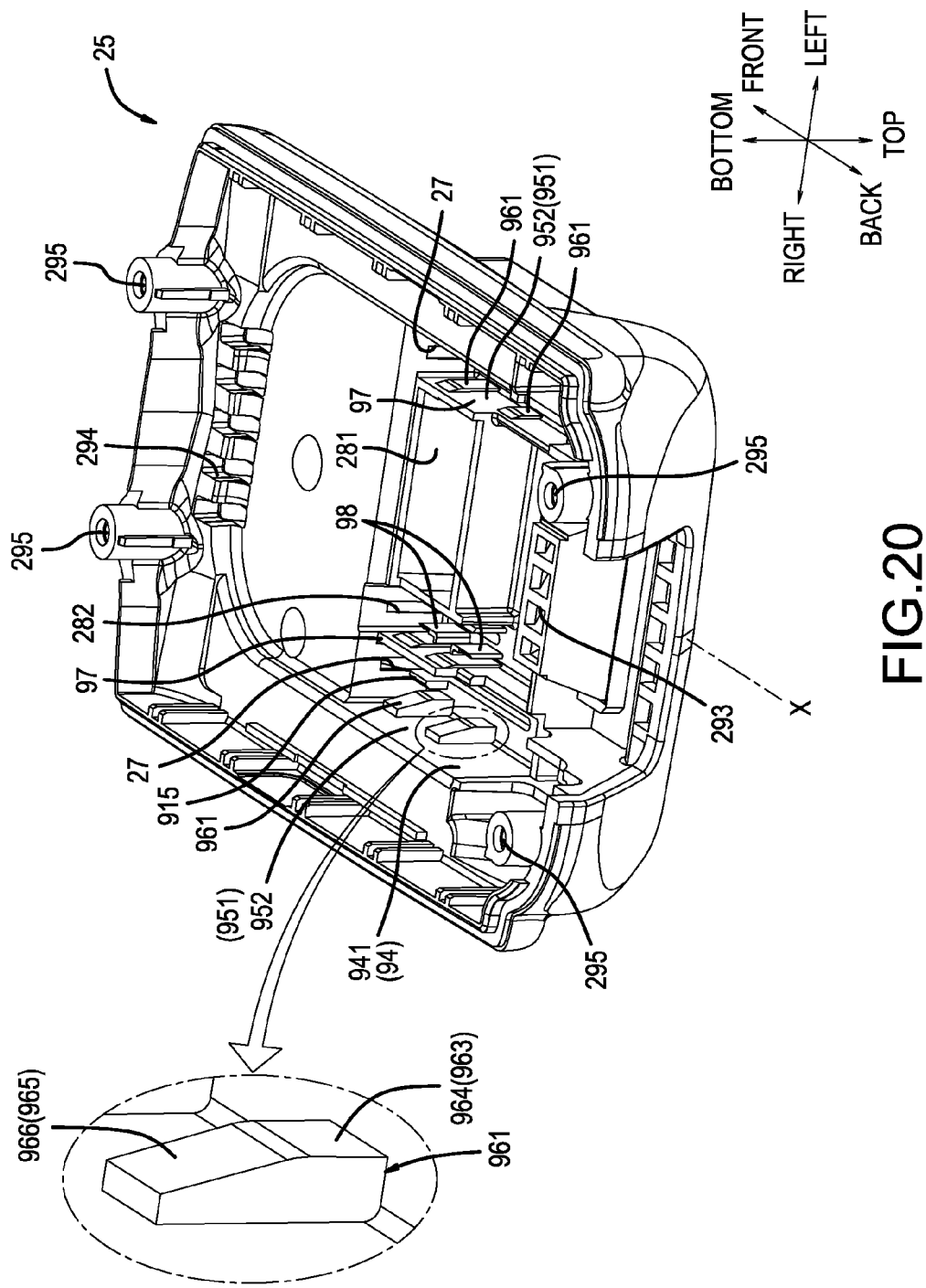
FIG. 20 is an oblique view that shows the interior of the case-cover part viewed in a direction different from that of FIG. 19.

The abutting-support parts 80 are provided or located on the column parts 73, which constitute the support-frame parts 70. Specifically, the abutting-support parts 80 are provided or located on both the column main bodies 74 and on the terminal-support parts 75. The abutting-support parts 80 bulge (project) toward the outer sides and away from each other. That is, the abutting-support parts 80 bulge toward the facing sandwiching-wall parts 94. FIG. 18 is a cross-sectional view that shows a cross-sectional auxiliary view taken along the line (XVIII)-(XVIII) in FIG. 5 and illustrates the interior of the battery pack 20 when the case-cover part 25 has been assembled to the case main body 23. FIG. 20 illustrates the relative structure between the terminal parts 63 and the sandwiching-wall parts 94, which are disposed on the outer sides of the terminal parts 63. That is, the abutting-support parts 80 bulge toward the outer side by an amount such that they approach the sandwiching-wall parts 94 more than the above-mentioned terminal parts 63 do. The abutting-support parts 80 are provided or located on both the column main bodies 74 and on the terminal-support parts 75 of the column parts 73, and face the outer sides.

Each abutting-support part 80 is formed with a shape that follows along an outer-perimetric (outer perimeter) shape of the column main body 74 and an outer-perimetric (outer perimeter) shape of the terminal-support part 75. A lower-side abutting-support part 81 provided on the column main body 74 is formed with an approximately right-triangular shape that corresponds to the approximately right-triangular shape of the column main body 74. The lower-side abutting-support part 81 has an approximately right-triangular shape in side view and bulges toward the outer side. In addition, an upper-side abutting-support part 82 provided on the terminal-support part 75 has an approximately rectangular shape that corresponds to the approximate rectangle shape of the terminal-support part 75. The upper-side abutting-support part 82 is an approximate rectangle in side view and bulges toward the outer side. These bulging abutting-support parts 80 are fabricated by press working, stamping or a similar process. Furthermore, each abutting-support part 80, the outer-side surface of which is convexly shaped, has an inner-side surface that is concavely shaped. That is, each abutting-support part 80 is formed such that it bulges toward the outer side to form a step so that the outer edges of the outer-side surfaces of the column main body 74 and the terminal-support part 75 are provided with a one-step level difference. Consequently, and as discussed below, each abutting-support part 80 naturally bulges (extends) toward the outer side more than the terminal parts 63 do. Furthermore, the lower-side abutting-support part 81 and the upper-side abutting-support part 82 bulge toward the outer side such that they are continuous with one another without being divided into sections. Consequently, the range over which the lower-side abutting-support part 81 is provided is greater than that of the upper-side abutting-support part 82. In other words, each abutting-support part 80 is formed such that the location of the support-frame part 70 proximate to the support-seat part 61 corresponds to and enlarges the range (area) over which the support-seat part 61 extends.

The front-side end-edge part 741 of each of the above-mentioned column parts 73 is provided with a front bend-restraining rib 85 that restricts the bending of the column part 73. The front bend-restraining ribs 85 are formed by folding the front-side end-edge parts 741 of the column parts 73, which extend in the vertical directions, toward the inner sides so that they face one another. The directions in which the front bend-restraining ribs 85 are folded are the left-right directions, orthogonal to the front-rear directions and to the extension direction of the column parts 73 (the column main bodies 74 and the terminal-support parts 75). That is, the directions in which the front bend-restraining ribs 85 are folded are directions orthogonal to the attachment-detachment sliding directions of the battery pack 20. More specifically, each front bend-restraining rib 85 is formed such that the entire range (area) of the front-side end-edge part 741 of the column main body 74 and the lower-side half range of the front-side end-edge part 741 of the terminal-support part 75 are continuous. By virtue of the front bend-restraining rib 85 being bent thus in directions orthogonal to the column part 73, a stiffening effect is obtained that restricts or impedes the bending of the column part 73 itself. That is, the front bend-restraining rib 85 acts to minimize or suppress (prevent) the deformation of the curvature of the column part 73 in the left-right directions.

Figure 19:
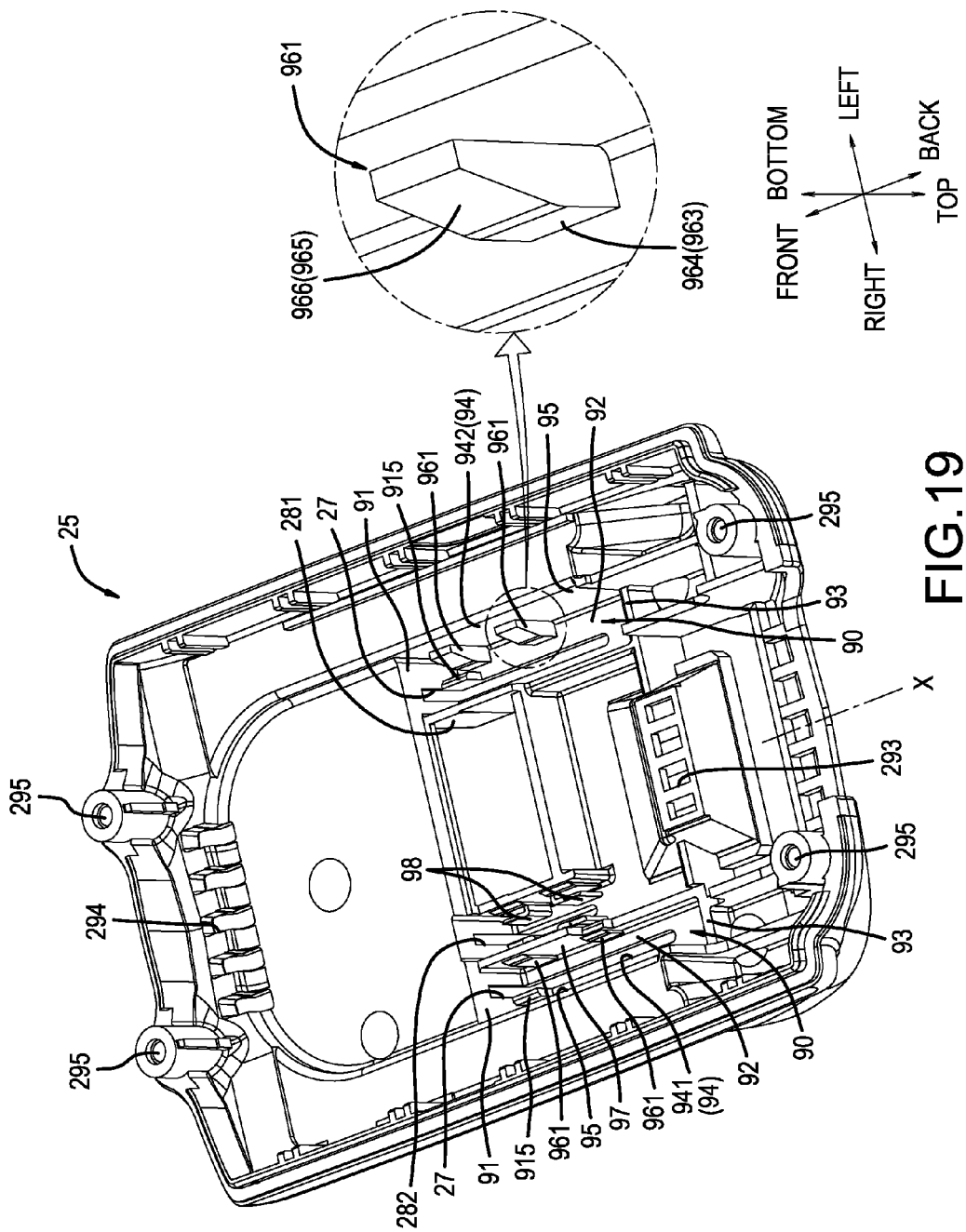
FIG. 19 is an oblique view that shows the interior of a case-cover part.
Figure 21:
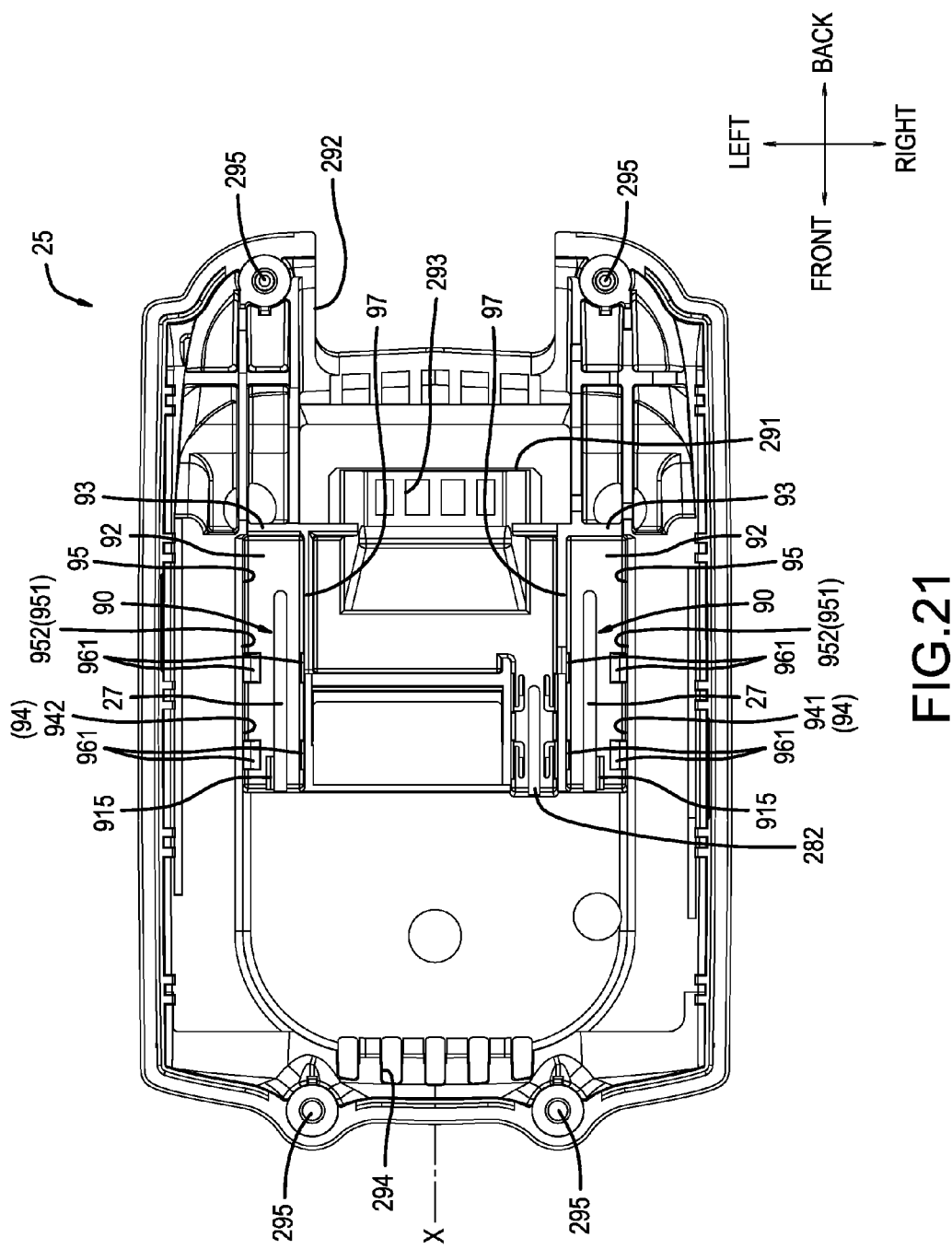
FIG. 21 is a plan view that shows the interior of the case-cover part.
Figure 22:
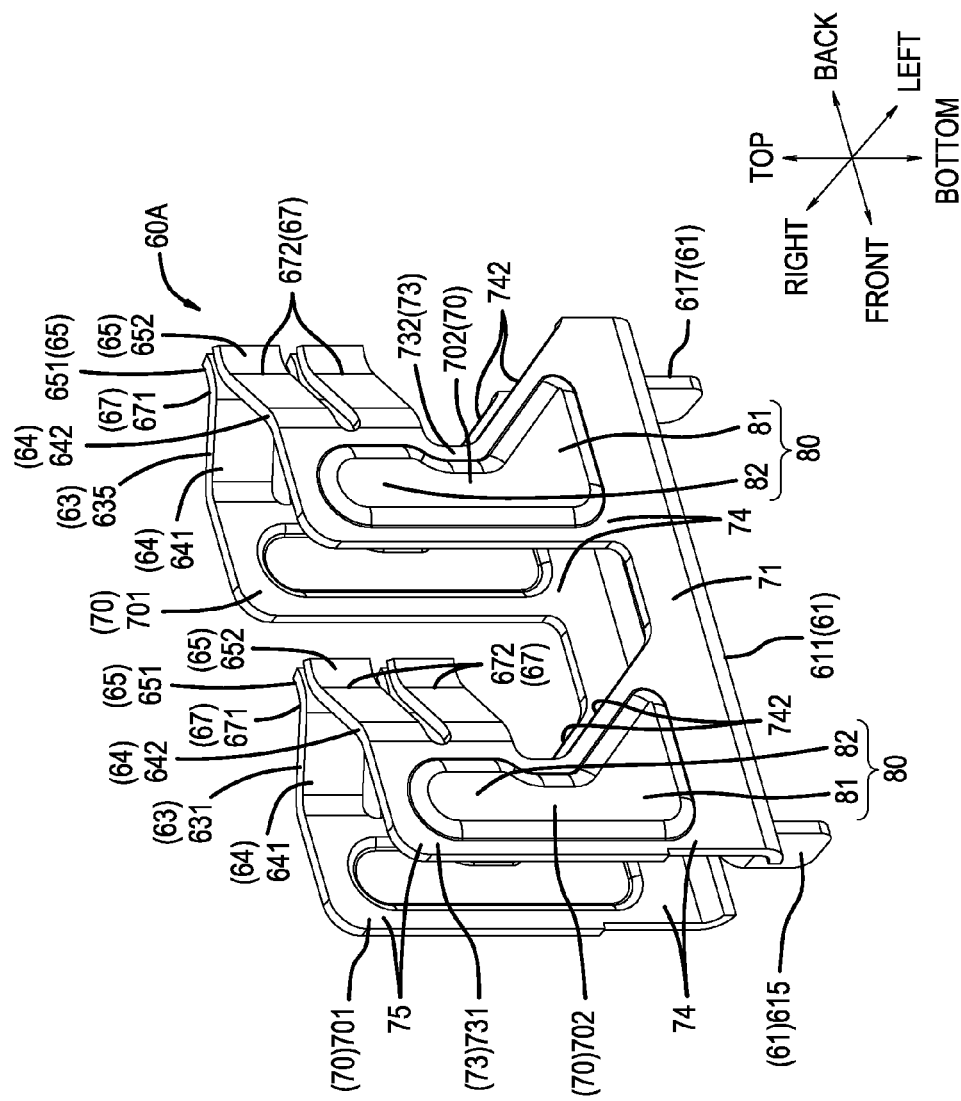
FIG. 22 is an oblique view that shows the front side of the terminal component according to a second embodiment.
Figure 23:
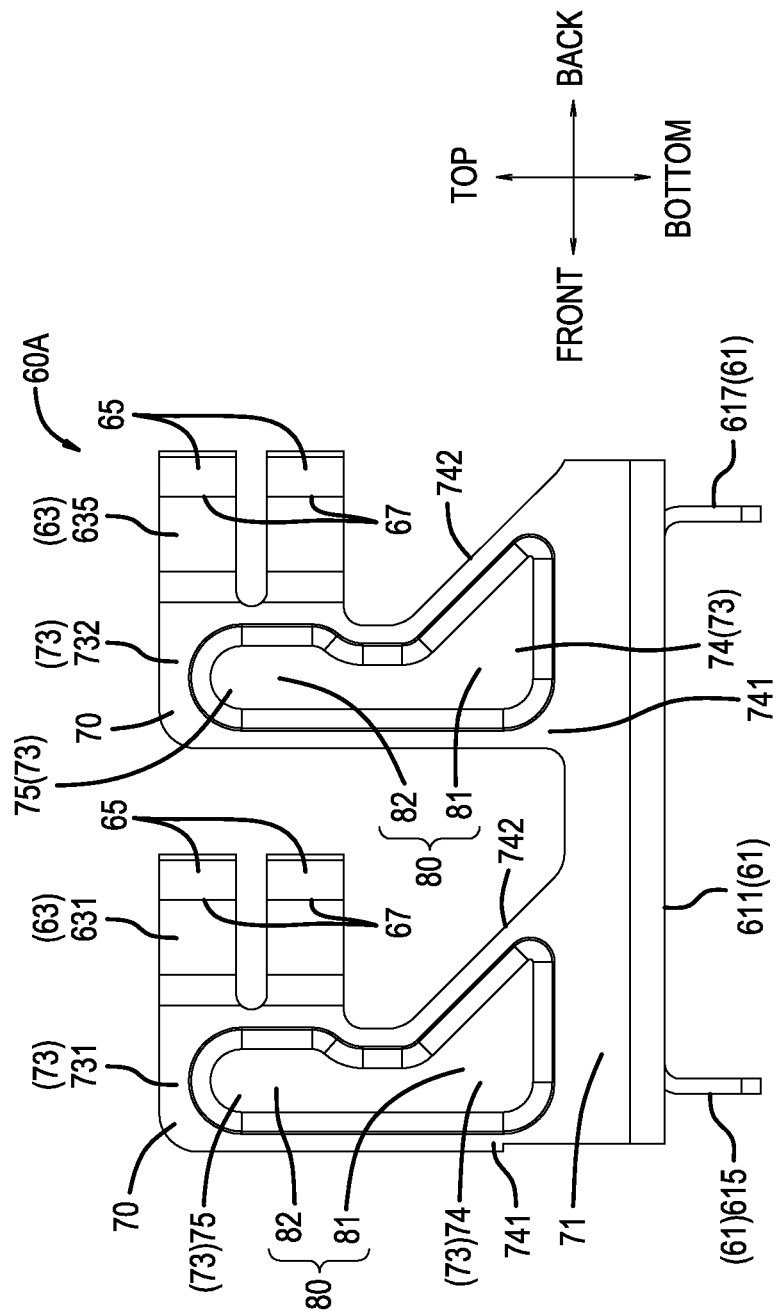
FIG. 23 is a side elevational view that shows the terminal component according to the second embodiment.
Figure 24:
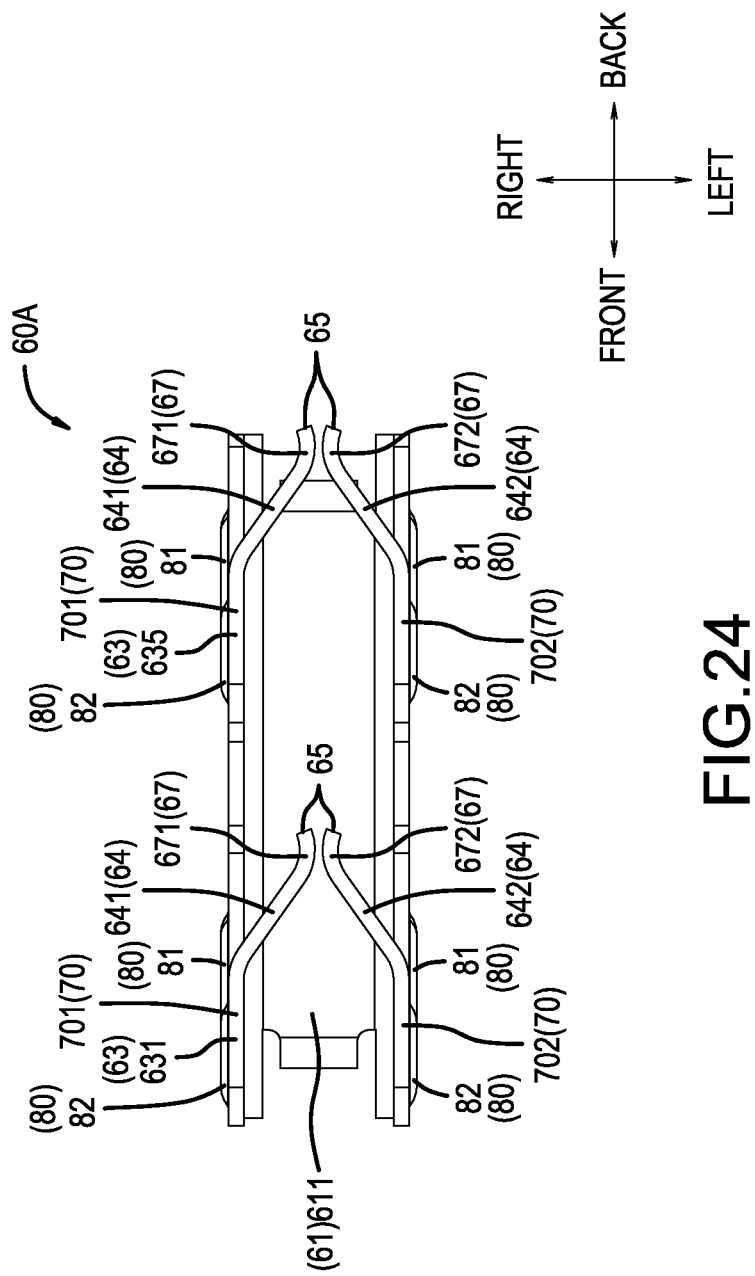
FIG. 24 is a top plan view that shows the terminal component according to the second embodiment.
Figure 25:
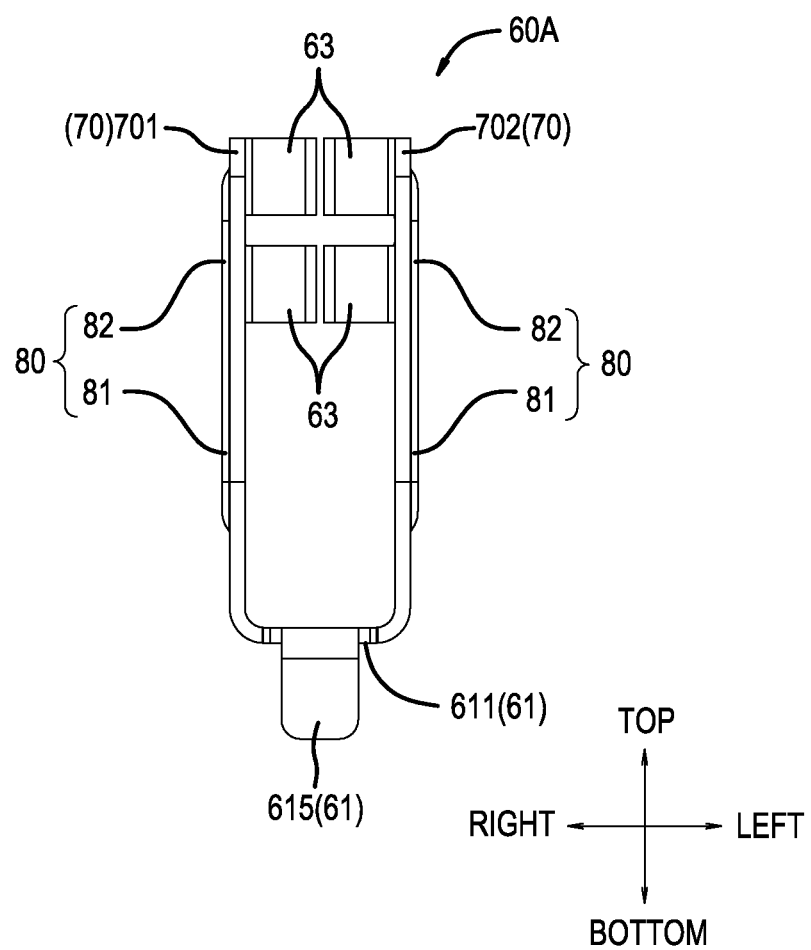
FIG. 25 is a front elevational view that shows the terminal component according to the second embodiment.
Figure 26:
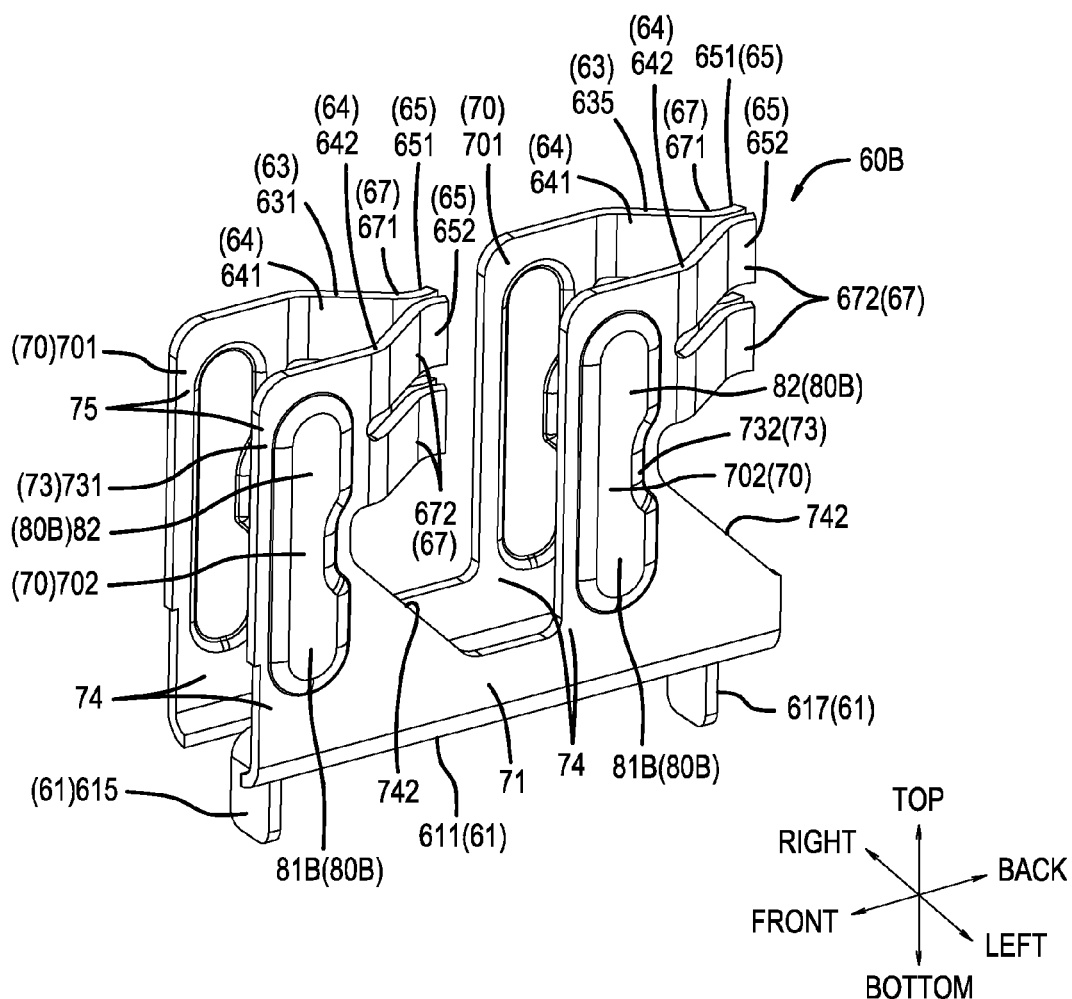
FIG. 26 is an oblique view that shows the front side of the terminal component according to a third embodiment.
Figure 27:
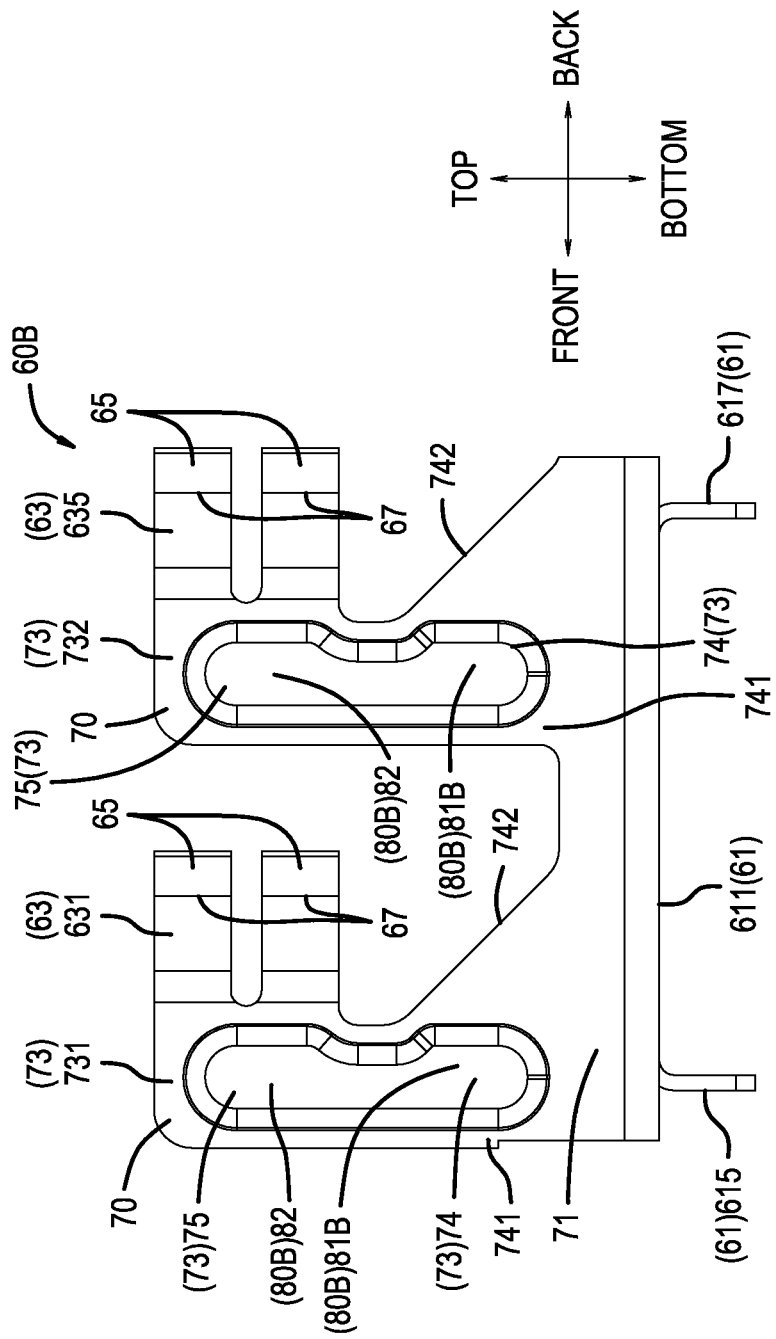
FIG. 27 is a side elevational view that shows the terminal component according to the third embodiment.
Figure 28:
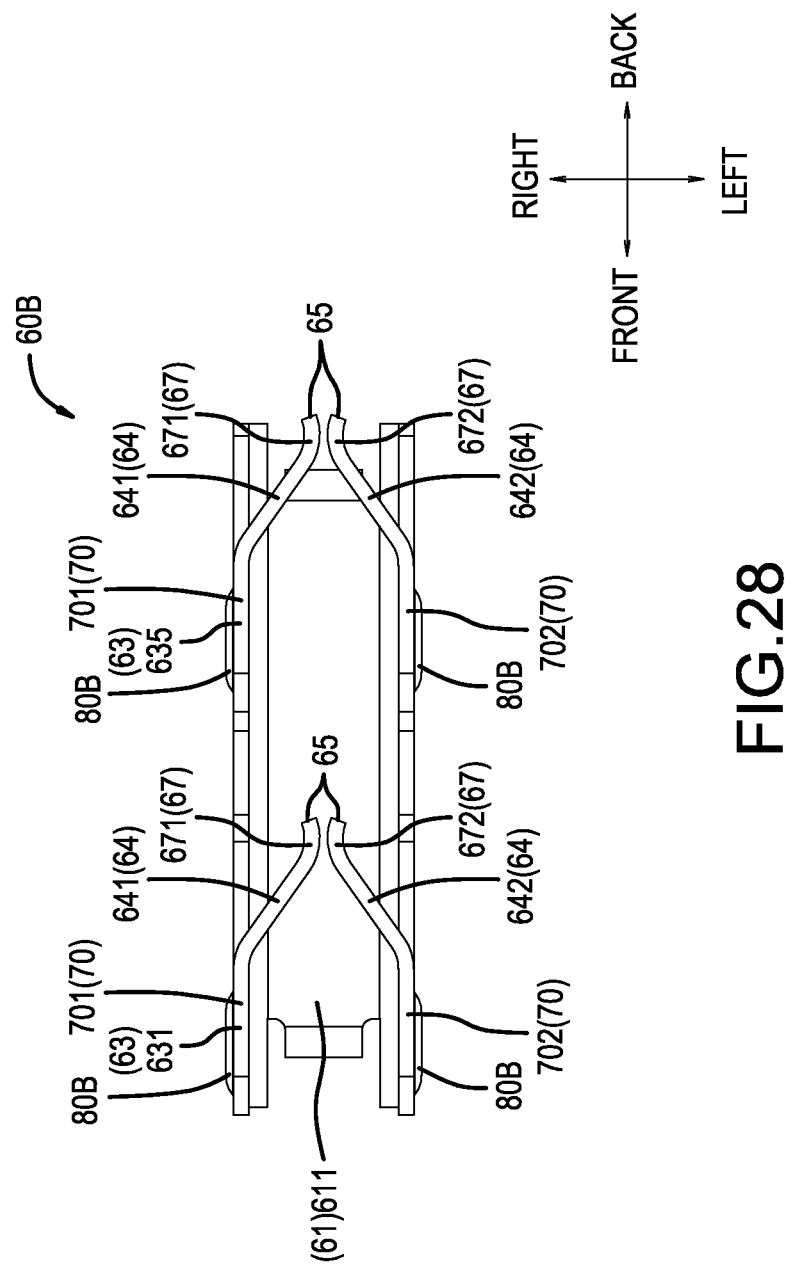
FIG. 28 is a top plan view that shows the terminal component according to the third embodiment.
Figure 29:
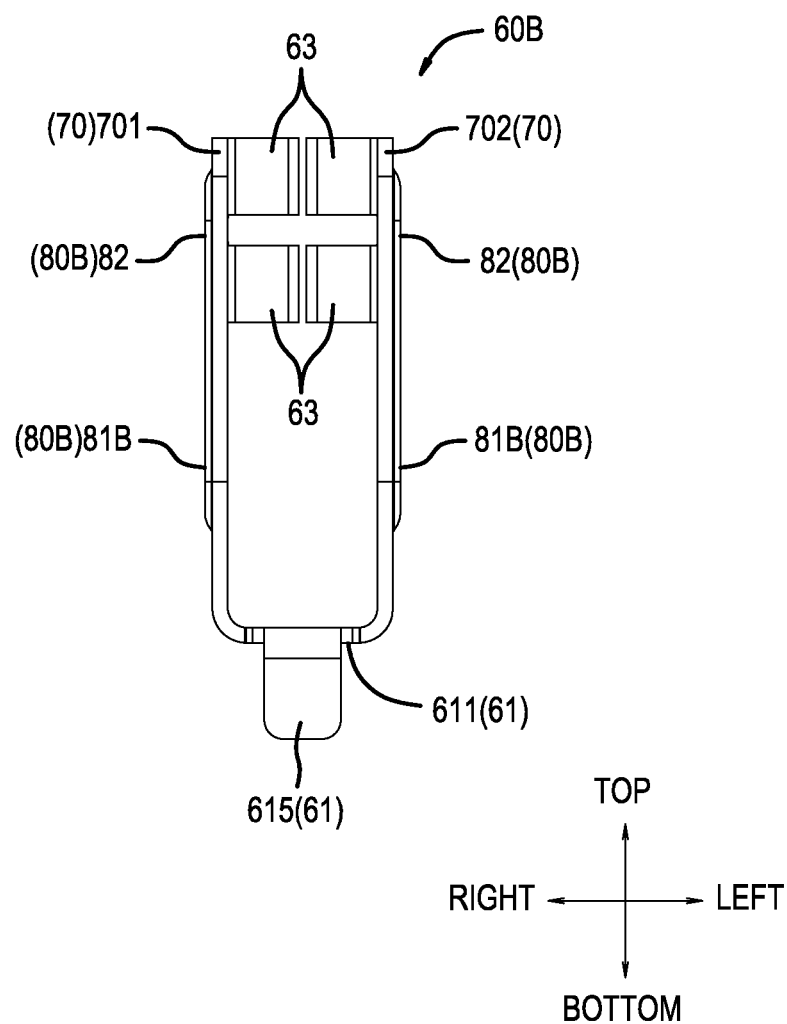
FIG. 29 is a front elevational view that shows the terminal component according to the third embodiment.
Figure 30:
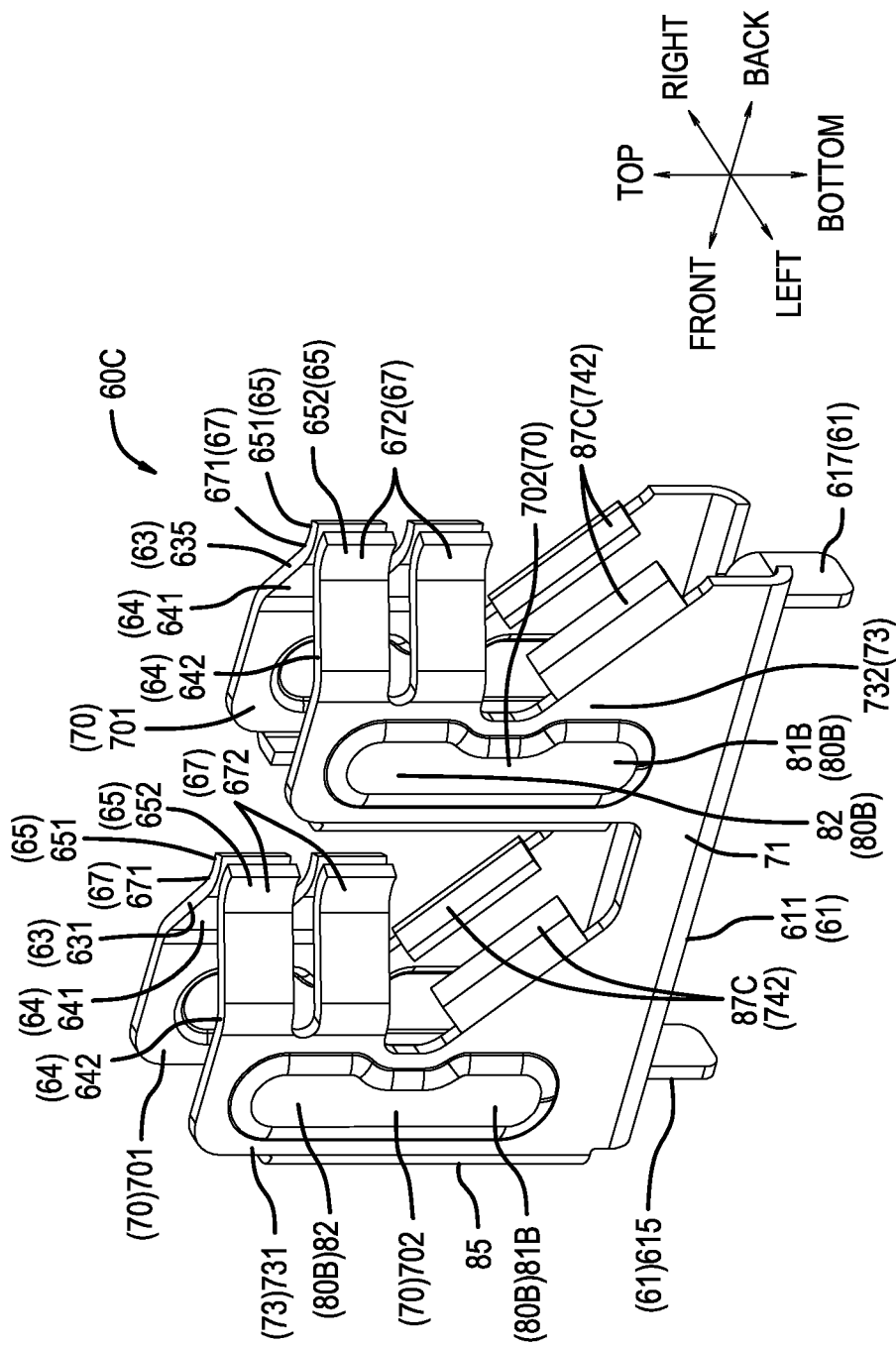
FIG. 30 is an oblique view that shows the rear side of the terminal component according to a fourth embodiment.
Figure 31:
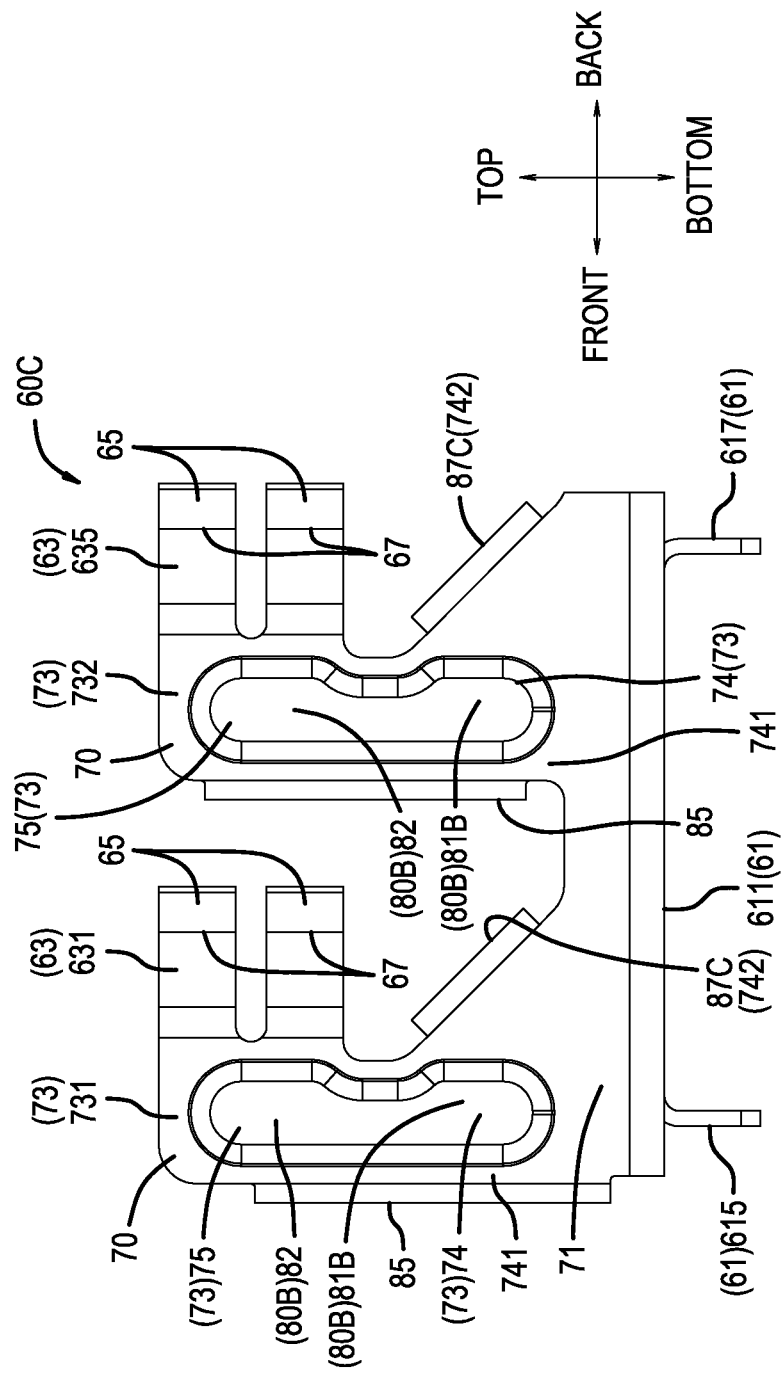
FIG. 31 is a side elevational view that shows the terminal component according to the fourth embodiment.
Figure 32:
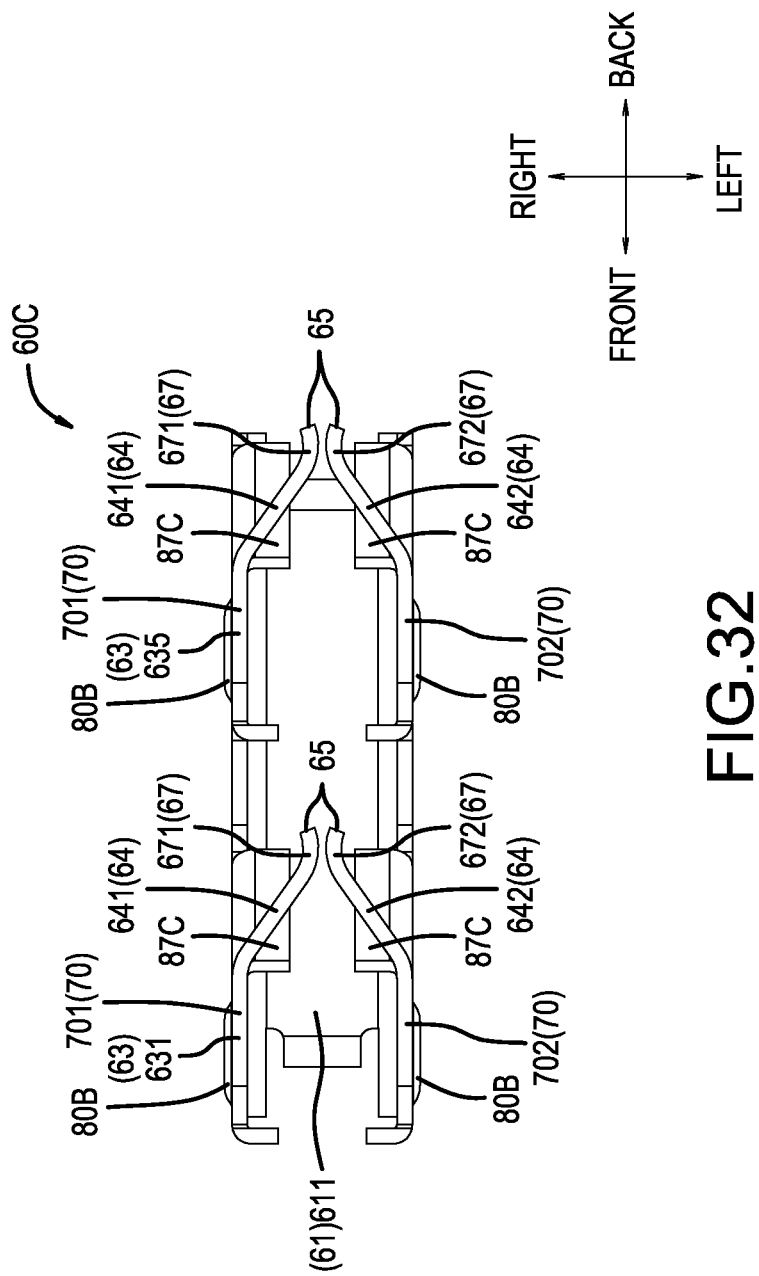
FIG. 32 is a top plan view that shows the terminal component according to the fourth embodiment.
Figure 33:
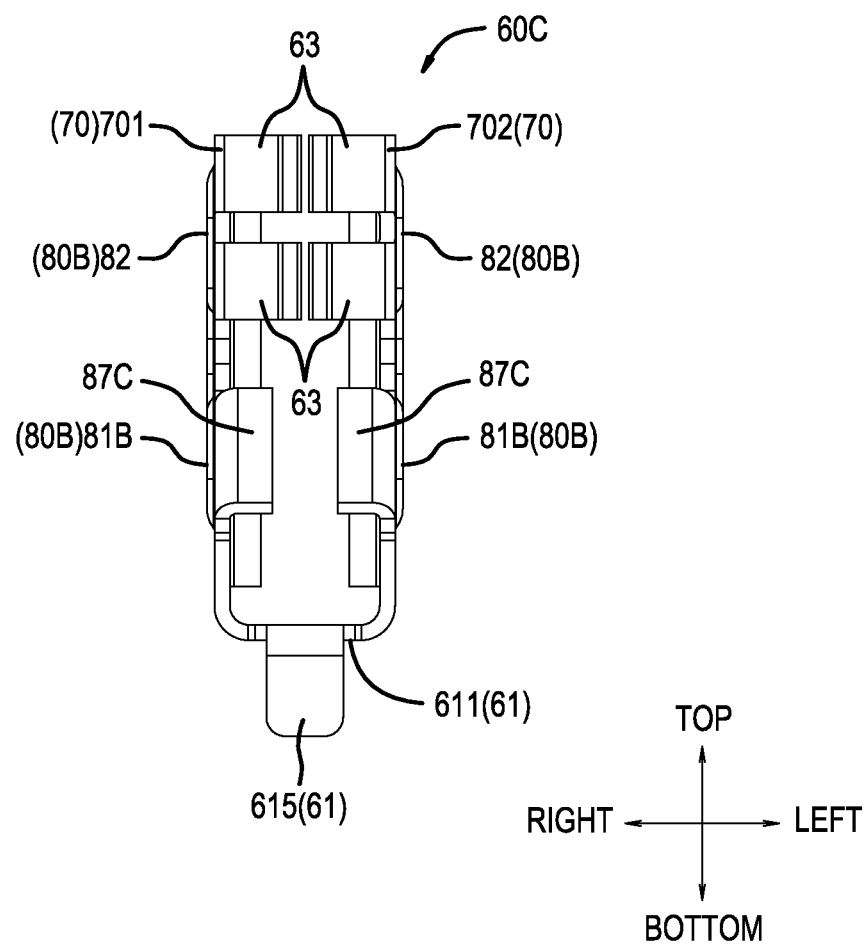
FIG. 33 is a rear elevational view that shows the terminal component according to the fourth embodiment.

Next, the case-cover part 25, which includes the sandwiching-wall parts 94, will be explained with reference to FIGS. 19-21 and is marked with the same reference numerals mentioned above. In addition, reference numerals 295 are female screw holes (threaded openings) that are used for connecting the case-cover part 25 to the case main body 23. Sectional structures 90 are provided inside the case-cover part 25. The sectional structures 90 demarcate the perimeters of the terminal components 60 such that the terminal components 60 attached to the circuit board 42 do not electrically contact other elements. The sectional structures 90 are provided for the ground terminals 441 and the discharge terminals 442. Consequently, the slits 27, which enable the connection terminals 181 to be connected to the terminal components 60, are provided in the vicinities of the centers of the sectional structures 90. Conversely, the sectional structures 90 are located, within the case-cover part 25, at the perimeter of the slit 27 corresponding to the ground terminals 441 and the perimeter of the slit 27 corresponding to the discharge terminals 442.

Each sectional structure 90 substantially comprises a front-wall part 91, an upper-wall part 92, a section-rib part 93, and the sandwiching-wall parts 94. The front-wall part 91 forms a section wall on the front side of the sectional structure 90, and the slit 27 is provided in the front-wall part 91. The front-wall part 91 divides the interior and exterior of the case 21. The upper-wall part 92 forms the section wall on the upper side of the sectional structure 90 and also includes a portion of the slit 27 for the insertion of the connection terminal 181. The upper-wall part 92 also divides the interior and the exterior of the case 21. The section-rib part 93 forms a section wall on the rear side of the sectional structure 90. The section-rib part 93 is formed because the case-cover part 25 has a rib shape that protrudes toward the interior side. The section-rib part 93 functions as a partition that better inhibits the potential (possibility) for electrical conductivity between electrical parts provided inside the case 21 and is configured such that it sectionalizes (partitions) the interior of the case 21 (i.e. divides the interior of the case 21 into sections).

The sandwiching-wall parts 94 have the same functions as the above-mentioned section-rib parts 93. That is, the sandwiching-wall parts 94 also function as partitions that further reduce the potential (possibility) for electrical conductivity between the electrical components inside the case 21 and are provided to sectionalize (partition) the interior of the case 21. The sandwiching-wall parts 94 are provided at both the left- and right-side locations of the case-cover part 25 facing the locations where the connection terminals 181 will be received. Consequently, the sandwiching-wall parts 94 are disposed such that the terminal components 60 attached to the circuit board 42 are sandwiched from (bounded at) their outer sides, which are both the left and right sides. The sandwiching-wall parts 94 are formed at locations where the ground terminals 441 are provided and at locations where the discharge terminals 442 are provided and are both symmetrical to one another. That is, a ground-side sandwiching-wall part 941 is provided corresponding to the location at which the ground terminals 441 are provided and a discharge-side sandwiching-wall part 942 is provided corresponding to the location at which the discharge terminals 442 are provided; they have left-right symmetry with respect to a center axis X, extending in the front-rear direction, of the battery pack 20. Consequently, elements that are configured substantially the same due to their symmetric structure are identified using the same reference numerals and are explained hereinbelow. Specifically, the ones of the ground-side sandwiching-wall parts 941 and the discharge-side sandwiching-wall parts 942 that are most spaced apart from the center axis X are defined as outer-side sandwiching-wall parts 95. In addition, the ones of the ground-side sandwiching-wall parts 941 and the discharge-side sandwiching-wall parts 942 that are most proximate to the center axis X are defined as inner-side sandwiching-wall parts 97. The outer-side sandwiching-wall parts 95 and the inner-side sandwiching-wall parts 97 are mirror images of each other, i.e. they face and have the same structure as one another.

The outer-side sandwiching-wall parts 95 will now be discussed. As shown in FIG. 19 and FIG. 20, each outer-side sandwiching-wall part 95 generally comprises a section-wall body 951 and contact-rib parts 961. The section-wall body 951 is a wall structure that defines the range over which the terminal component 60 extends. The section-wall body 951 has a wall surface 952 that extends in the front-rear direction. The wall surface 952 has a front-rear up-down plane that coincides with the directions in which the terminal component 60 (the ground terminal 441, the discharge terminal 442) extends when attached to the circuit board 42. The wall surface 952 faces the attached terminal component 60 and is provided with the contact-rib parts 961, which bulge (project) from the wall surface 952 toward the terminal component 60. The contact-rib parts 961 are formed at locations corresponding to the support-frame parts 70 of the terminal component 60, more specifically, at locations at which they can contact the abutting-support parts 80 of the above-mentioned column parts 73. The contact-rib parts 961 bulge (project) toward the terminal component 60 at the locations at which the contact-rib parts 961 are contacted by the abutting-support parts 80.

The contact-rib parts 961 face the abutting-support parts 80 at two locations, namely, at the front-side terminal parts 631 and at the rear-side terminal parts 635. Consequently, the contact-rib parts 961 are provided at two locations on the wall surface 952 of the section-wall body 951 in a row in the front-rear direction. The two contact-rib parts 961 at the two locations are the same shape. Each contact-rib part 961 is a rib that is continuous with both the upper-wall part 92 and the section-wall body 951 and protrudes toward the location at which the terminal component 60 is disposed. Each contact-rib part 961 substantially comprises a support-rectangle part 963 and an assembly-slant part 965. The support-rectangle part 963 protrudes from the wall surface 952 of the section-wall body 951 toward the slit 27, which is the side on which the terminal component 60 is disposed. A seat 964 of the support-rectangle part 963, which faces the terminal component 60, is formed or defined in a plane extending in the front-rear and up-down directions. Furthermore, the range of the seat 964 of the support-rectangle part 963 overlaps the range of the terminal-support part 75 of the above-mentioned column part 73.

Each support-rectangle part 963 is formed so that it abuts and supports the terminal component 60 when it has been deformed by sandwiching the connection terminal 181. That is, when the connection terminal 181 is inserted into the terminal parts 63, the sandwiching terminal parts 63 undergo curvature deformation commensurate with the amount by which the connection terminal 181 is sandwiched (the amount by which the connection terminal has pressed the sandwiching terminal parts 63 apart from one another). More specifically, the terminal parts 63 deform such that both the left and right outer sides thereof spread by an amount equal to the thickness of the connection terminal 181. Consequently, the terminal-support parts 75, which support the terminal parts 63, are also deformed based on the deformation of the terminal parts 63. That is, depending on how much the terminal parts 63 spread toward both the left and right outer sides, the terminal-support parts 75 also undergo deformation so that they also spread toward both the left and right outer sides. In the terminal-support part 75 that undergoes this deformation, even with just a slight deformation of the terminal-support part 75, the upper-side abutting-support part 82 (the abutting-support part 80) provided on the terminal-support part 75 contacts the seat 964 of the support-rectangle part 963. Because the upper-side abutting-support part 82 makes contact with the seat 964, the support-rectangle part 963 supports the terminal-support part 75 such that deformation of the terminal-support part 75 is reduced. The effect of supporting the terminal-support part 75 in this manner leads to an increase in the force with which the terminal parts 63 sandwich (squeeze) the connection terminal 181. Furthermore, when the terminal parts 63 are not sandwiching (squeezing) the connection terminal 181, a spacing is present between the upper-side abutting-support part 82 of the terminal component 60 and the seat 964 of the support-rectangle part 963 and a clearance (gap), although quite small, arises therebetween.

In contrast, each assembly-slant part 965 is provided on the lower side of the support-rectangle part 963 such that it is continuously connected to (is continuously formed with) the support-rectangle part 963. The assembly-slant part 965 has a slanted planar surface 966 that constitutes a plane that intersects the seat 964 of the support-rectangle part 963. The slanted planar surface 966 is tilted (angled or inclined) such that it becomes more spaced apart from the terminal component 60 as it goes from the upper side to the lower side. Consequently, the clearance between the above-mentioned abutting-support part 80 and the assembly-slant part 965 increases in a direction toward the lower side of the assembly-slant part 965. In this way, the clearance is properly provided between the sandwiching-wall part 94 and the terminal component 60 attached to the circuit board 42. That is, when the case-cover part 25 is to be assembled to the case main body 23, the clearance is set such that interference due to friction, impact from the terminal component 60 attached to the circuit board 42, or the like is avoided. That is, an adequate ease of assembly of the case-cover part 25 to the case main body 23 is ensured by the clearance between the terminal component 60 and the sandwiching-wall part 94.

Furthermore, the assembly-slant part 965 also makes an abutting connection to (contact with) the terminal component 60 after it has been deformed by the insertion of the connection terminal 181. That is, when the terminal parts 63 have sandwiched (squeezed/contacted opposite sides of) the connection terminal 181, the terminal parts 63 deform and spread toward both the left and right outer sides by an amount equal to the thickness of the connection terminal 181, and the terminal-support parts 75 also deform such that they spread toward both the left and right outer sides. The column main bodies 74 of the column parts 73 also deform and spread toward both the left and right outer sides based on the spreading of the terminal-support parts 75 toward both the left and right outer sides. At this time, each lower-side abutting-support part 81 (the abutting-support part 80) provided on the deformed column main body 74 comes into contact with the slanted planar surface 966 of the assembly-slant part 965. Because of this, the assembly-slant part 965 can support the column main body 74 and reduce deformation of the column main body 74. Furthermore, supporting the column main body 74 in this manner increases the force with which the terminal parts 63 sandwich (squeeze) the connection terminal 181.

The inner-side sandwiching-wall parts 97 differ from the outer-side sandwiching-wall parts 95 in the amount by which they bulge (project) relative to the contact-rib parts 961 but are provided with substantially the same structure at substantially the same symmetric positions as the outer-side sandwiching-wall parts 95. That is, the inner-side sandwiching-wall parts 97 have a structure that is substantially symmetric with that of the outer-side sandwiching-wall parts 95, where the slit 27 serves as the centerline of symmetry. Consequently, elements of the inner-side sandwiching-wall parts 97 that are configured substantially the same as those of the above-mentioned outer-side sandwiching-wall parts 95 are identified using the same reference numerals. Furthermore, as illustrated, the amount of bulging (projecting) and the height of the contact-rib parts 961 provided on the inner-side sandwiching-wall parts 97 are smaller than those of the contact-rib parts 961 provided on the above-mentioned outer-side sandwiching-wall parts 95. That is, the contact-rib parts 961 provided on the inner-side sandwiching-wall parts 97 are configured in view of the internal structure of the case-cover part 25. More specifically, the amount by which the contact-rib part 961 bulges (projects) from the wall surface 952 toward the terminal component 60 is smaller than the amount by which the contact-rib part 961 provided on the outer-side sandwiching-wall part 95 bulges (projects). In addition, the heights of the lined-up contact-rib parts 961 are based on lengths of structures in the internal structure and may vary as appropriate.

In addition, a guide part 915 is provided at a boundary portion between the front-wall part 91 and the upper-wall part 92. The guide part 915 faces the slit 27 at both the front-wall part 91 and the upper-wall part 92. Specifically, the guide part 915 is continuously connected to an end-edge portion of the slit 27 in the front-wall part 91 and protrudes toward the interior side, and is also continuously connected to an end-edge portion of the slit 27 in the upper-wall part 92 and protrudes toward the interior side. When the above-mentioned connection terminal 181 is inserted into the slit 27, the guide part 915 serves to guide the insertion of the connection terminal 181. In addition, support-tab parts 98 for supporting the charging terminal 461 and the communication terminal 462 are provided in the vicinity of the slit 282.

The battery pack 20 configured as described above is capable of achieving, e.g., the following operational effects. For example, in the battery pack 20, the sandwiching-wall parts 94, which sandwich the terminal components 60 from their outer sides, are provided in the case-cover part 25. The terminal components 60 and the sandwiching-wall parts 94 are configured such that they cause the abutting-support parts 80, which are provided on the support-frame parts 70 of the terminal components 60 that face the sandwiching-wall parts 94, to touch (contact) the sandwiching-wall parts 94 when the terminal parts 63 are sandwiching (squeezing) the connection terminals 181. In this manner, when the terminal components 60 are sandwiching (squeezing) the connection terminals 181, the abutting-support parts 80 are touching (contacting) the sandwiching-wall parts 94 and receive support from the sandwiching-wall parts 94. Accordingly, even if the design of the terminal components 60 is changed slightly, the sandwiching load of the terminal components 60 sandwiching the connection terminals 181 can be maintained at an appropriate load that makes such a minor design change possible.

In addition, according to the above-mentioned battery pack 20, the terminal components 60 and the sandwiching-wall parts 94 are configured such that they become non-contacting and spaced apart from one another when the terminal parts 63 are not sandwiching the connection terminals 181. Therefore, when the case-cover part 25 is to be joined or fixedly attached to the case main body 23, the terminal components 60 can be assembled and united without making contact with the sandwiching-wall parts 94 of the case-cover part 25. Accordingly, assembling the case main body 23 and the case-cover part 25 can be made easier, and manufacturing can be made more convenient. In addition, because the abutting-support parts 80 are provided or located on the support-frame parts 70, and the support-frame parts 70 continuously connect the support-seat parts 61 and the terminal parts 63, the terminal parts 63 sandwiching the connection terminals 181 are satisfactorily supported. At the same time, supporting the terminal parts 63 via the support-frame parts 70 makes it possible to provide some margin in the sandwiching of the connection terminals 181 by the terminal parts 63. Therefore, it is possible to ensure the ease with which the connection terminals 181 are inserted between the terminal parts 63 (maintain an amount of force required to insert the connection terminals 181) and to maintain the ease with which the battery pack 20 is mounted to the tool main body 11.

In addition, in each lower-side abutting-support part 81, the location proximate to the support-seat part 61 is enlarged such that it corresponds to the range over which the support-seat part 61 extends. Conversely speaking, the range over which the lower-side abutting-support part 81 is provided becomes smaller as it goes toward the terminal parts 63. This better ensures inward and outward movement at the terminal parts 63 and better ensures the ease of insertion of the connection terminals 181 between the terminal parts 63. Accordingly, the ease with which the battery pack 20 is mounted to the tool main body 11 (the amount of force required to mount the battery pack 20 to the tool main body) can be maintained. In addition, the abutting-support part 80 bulges (extends or projects) toward the facing sandwiching-wall parts 94 more than the terminal parts 63 do, and therefore only the abutting-support parts 80 can easily touch the sandwiching-wall parts 94. Therefore, the abutting-support parts 80 can be made to touch (contact) the sandwiching-wall parts 94 and the sandwiching (squeezing) load of the terminal components 60 that sandwich the connection terminals 181 can be maintained at an appropriate load without providing any additional elements. In addition, the sandwiching-wall parts 94 extend in the attachment-detachment sliding directions such that they demarcate (divide) the outer perimeters of the terminal components 60, and therefore the electrically insulating properties of the outer perimeters of the terminal components 60 can be increased, thus making it possible to better prevent short circuits.

In addition, the contact-rib parts 961 are provided at the locations at which the sandwiching-wall parts 94 touch the abutting-support parts 80. The contact-rib parts 961 bulge (project) toward the terminal components 60, and therefore only the abutting-support parts 80 can easily touch (contact) the sandwiching-wall parts 94 and can do so more accurately. In this manner, the abutting-support parts 80 can be made to touch (contact) the sandwiching-wall parts 94 more accurately and without the providing additional structural elements. In addition, the terminal parts 63 can easily bend so that they track the sandwiching or insertion of the connection terminals 181 as they slide during attachment and detachment. Furthermore, the support-frame parts 70 can reduce or impede the bending that would otherwise occur during the sandwiching of the connection terminals 181 and can increase the contact load that the terminal components 60 impart (apply) to the connection terminals 181. In addition, because the abutting-support parts 80 also extend in the attachment-detachment sliding directions, the abutting-support parts 80 can increase the support force received from the sandwiching-wall parts 94. In addition, the terminal components 60 are configured such that they are symmetric with respect to the sandwiched connection terminals 181, and therefore the sandwiching (squeezing) of the connection terminals 181 by the terminal components 60 is matched on both sides (same force pressing toward the connection terminals 181 from both sides) and can thereby be balanced. In this manner, the contact load that the terminal components 60 impart to the connection terminals 181 can be balanced and increased. In addition, because the front bend-restraining ribs 85 are folded in the direction that intersects the attachment-detachment sliding directions, the stiffness of the support-frame parts 70 can be increased. Therefore, the contact load that the terminal components 60 impart to the connection terminals 181 can be increased further.

Second Embodiment

Next, various embodiments that are modified examples of the battery pack 20 according to the first embodiment will be described with reference to the drawings. Furthermore, the explanations of the second embodiment and subsequent embodiments are representative, non-limiting examples of configurations that differ from the battery pack 20 of the first embodiment only in the configuration of the terminal component 60. Consequently, in the explanations of the second embodiment and subsequent embodiments, various terminal components 60A, 60B, 60C, 60D are illustrated as modified examples of the above-mentioned terminal component 60. Furthermore, in the second embodiment and subsequent embodiments, elements configured in the same manner as the terminal component 60 of the first embodiment are identified using the same reference numerals that were used in connection with the terminal component 60, and therefore explanations thereof may be omitted. In addition, in subsequent embodiments, elements configured equivalently to those in the terminal component 60 of the above-mentioned first embodiment are explained by modifying, as appropriate, the suffix of the reference numeral that was used in connection with the first embodiment.

The terminal component 60A of the second embodiment is illustrated in FIG. 22 through FIG. 25 and differs from the terminal component 60 of the first embodiment only in that the front bend-restraining ribs 85 are not provided. Otherwise, the terminal component 60A is configured identically to the terminal component 60 of the first embodiment. Consequently, the same reference numerals used for the terminal component 60 of the first embodiment are used in FIG. 22 through FIG. 25.

The terminal component 60A of the second embodiment does not include the front bend-restraining ribs 85 of the first embodiment and is therefore easier to fabricate. That is, manufacturing can be simplified more than in the case of the terminal component 60 of the first embodiment, which is advantageous from the viewpoint of manufacturing. However, in the terminal component 60A of the second embodiment, the bending strength of the support-frame parts 70 may be weaker than that of the terminal component 60 of the above-mentioned first embodiment. Consequently, it may be desirable to increase the bending strength of the support-frame parts 70 by increasing the hardness of the metal plate used to manufacture the terminal component 60A. The terminal component 60A of the second embodiment also exhibits the same operational effects as those of the terminal component 60 of the above-mentioned first embodiment.

Third Embodiment

Reference numeral 60B shown in FIG. 26 through FIG. 29 denotes a modified example of the terminal component 60A of the second embodiment and differs from the terminal component 60A of the second embodiment only in the configuration of abutting-support parts 80B. Consequently, only the abutting-support parts 80B will be discussed. As in the above-described embodiments, the abutting-support parts 80B of the terminal component 60B of the third embodiment are also provided or located on both the column main bodies 74 of the column parts 73 and the terminal-support parts 75 and face outwardly. In this embodiment, however, the shape of a lower-side abutting-support part 81B provided on the column main body 74 differs from the shape of the lower-side abutting-support part 81 provided on the column main body 74 in the above-mentioned abutting-support part 80. Furthermore, as illustrated, except for the lower-side abutting-support parts 81B, the terminal component 60B is configured identically to the terminal component 60A of the second embodiment. Consequently, the reference numerals used to identify elements of the terminal component 60A of the second embodiment, which were carried forward from the terminal component 60 of the first embodiment, are also used in FIG. 26 through FIG. 29.

In the terminal component 60B of the third embodiment, the shape of the lower-side abutting-support parts 81B is simplified, and this simplifies fabrication. That is, the terminal component 60B of the third embodiment may be easier to manufacture than the terminal component 60A of the second embodiment. However, in the terminal component 60B of the third embodiment, the bending strength of the support-frame parts 70 may be weaker than that of the terminal component 60A of the second embodiment. Consequently, in the terminal component 60B of the third embodiment, it may be desirable to increase the bending strength of the support-frame parts 70 by increasing the hardness of the metal plate used to manufacture the terminal component 60B. Furthermore, the terminal component 60B of the third embodiment also exhibits the same operational effects as those of the terminal component 60A of the second embodiment.

Fourth Embodiment

Terminal component 60C shown in FIG. 30 through FIG. 33 is a modified example of the terminal component 60B of the third embodiment and differs from the terminal component 60A of the second embodiment in that the front bend-restraining ribs 85 and rear bend-restraining ribs 87C are provided. That is, ribs 85 and 87C serve as reinforcement structures to impede or prevent bending of the structures to which they are connected. Furthermore, as illustrated, the front bend-restraining ribs 85 of the terminal component 60C are configured identically to those of the terminal component 60 of the first embodiment. In contrast, the rear bend-restraining ribs 87C are newly provided and are not found in the terminal components 60, 60A, 60B of the first through third embodiments. Consequently, the reference numerals used to identify elements of the terminal component 60C of the third embodiment, which were carried forward from the terminal components 60, 60A of the first and second embodiments, are also used in FIG. 30 through FIG. 33.

The rear-side end-edge part 742 of each of the column parts 73 is provided with a rear bend-restraining rib 87C that restricts (impedes or prevents) the bending of the column part 73. The rear bend-restraining ribs 87C are formed by folding the rear-side end-edge parts 742 of the column parts 73, which extend in the front-rear slant directions, toward the inner sides so that they face one another. The directions in which the rear bend-restraining ribs 87C are folded are the left-right directions, which are orthogonal to the front-rear directions, i.e. the extension directions of the column parts 73 (the column main bodies 74 and the terminal-support parts 75). That is, the directions in which the rear bend-restraining ribs 87C are folded are the directions that intersect the attachment-detachment sliding directions of the battery pack 20. More specifically, each rear bend-restraining rib 87C is formed over the entire range of the rear-side end-edge of the column main body 74. Because the rear bend-restraining rib 87C is bent in a direction that intersects the column part 73, a stiffening effect is obtained that restricts (impedes or prevents) the bending of the column part 73 itself. That is, the rear bend-restraining rib 87C acts to reduce the ability of the column part 73 to deform in the left-right directions.

The front bend-restraining ribs 85 and the rear bend-restraining ribs 87C increase the stiffness of the support-frame parts 70 and thus enable the load with which the terminal component 60C contacts the connection terminal 181 to be increased. The increased stiffness provided by the front bend-restraining ribs 85 and the rear bend-restraining ribs 87C allows the terminal component 60C to be formed from a thinner and easier to bend metal, and this simplifies some aspects of manufacture. On the other hand, the fabrication work performed when manufacturing the terminal component 60C is relatively complicated and partially offsets the benefits provided by using a thinner metal. Consequently, even though the metal plate used to manufacture the terminal component 60C is thinner than in the preceding embodiments, the magnitude of the contact load applied to the connection terminal 181 can be maintained. Furthermore, the terminal component 60C of the fourth embodiment likewise exhibits the same operational effects as those of the terminal component 60 of the above-mentioned first embodiment.

Fifth Embodiment

Next, the terminal component 60D of the fifth embodiment, which differs from the terminal components 60, 60A, 60B, 60C of the first through fourth embodiments, will be described with reference to FIGS. 34-36. FIGS. 37 and 38 illustrate a conventional terminal component 60Z and are provided as a comparative example to highlight differences between the conventional terminal component 60Z and the terminal component 60D in FIG. 34. Furthermore, the terminal component 60D of the fifth embodiment is likewise a female terminal that is connectable to the connection terminal 181, which constitutes the male terminal.

Figure 34:
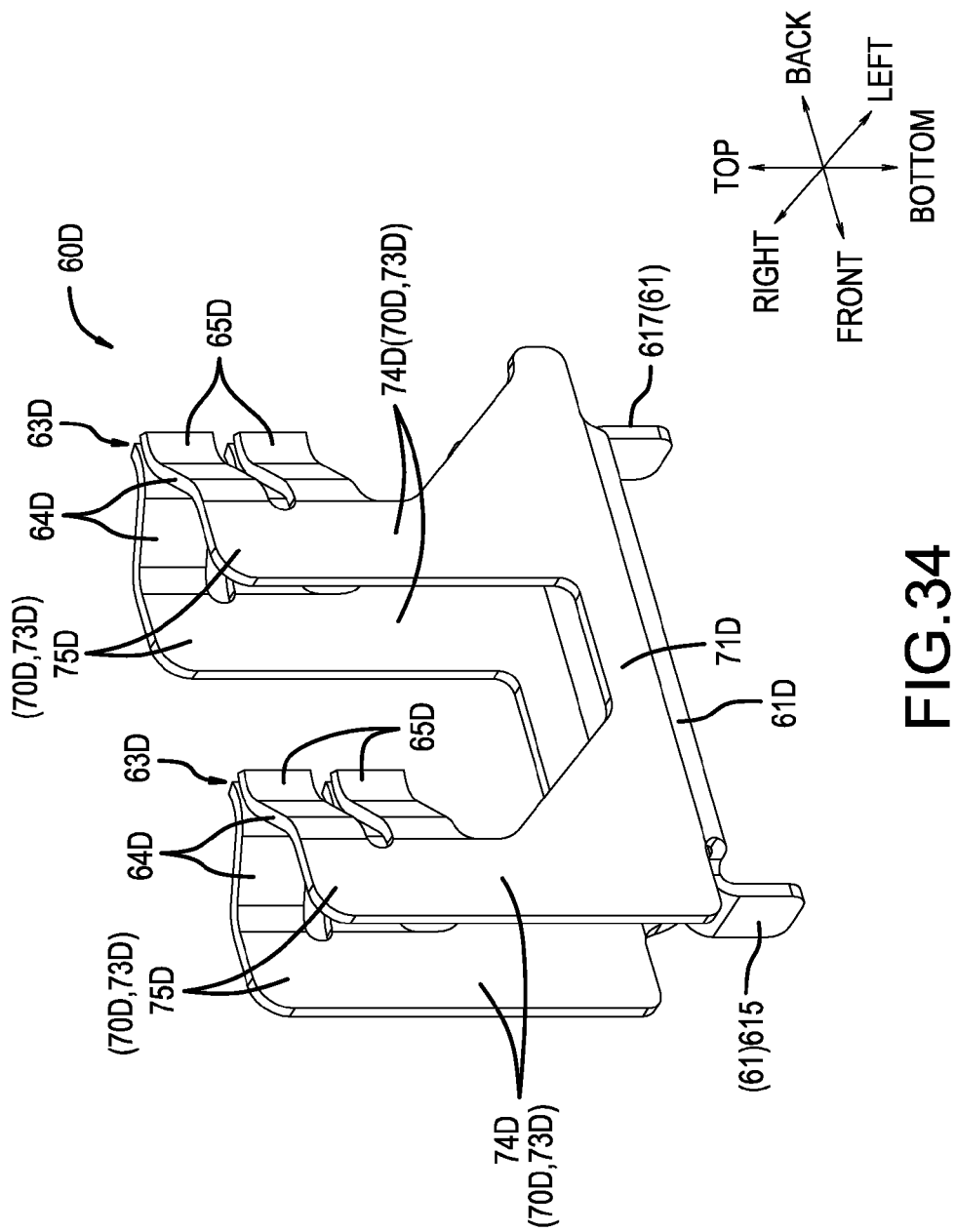
FIG. 34 is an oblique view that shows the front side of the terminal component according to a fifth embodiment.
Figure 35:
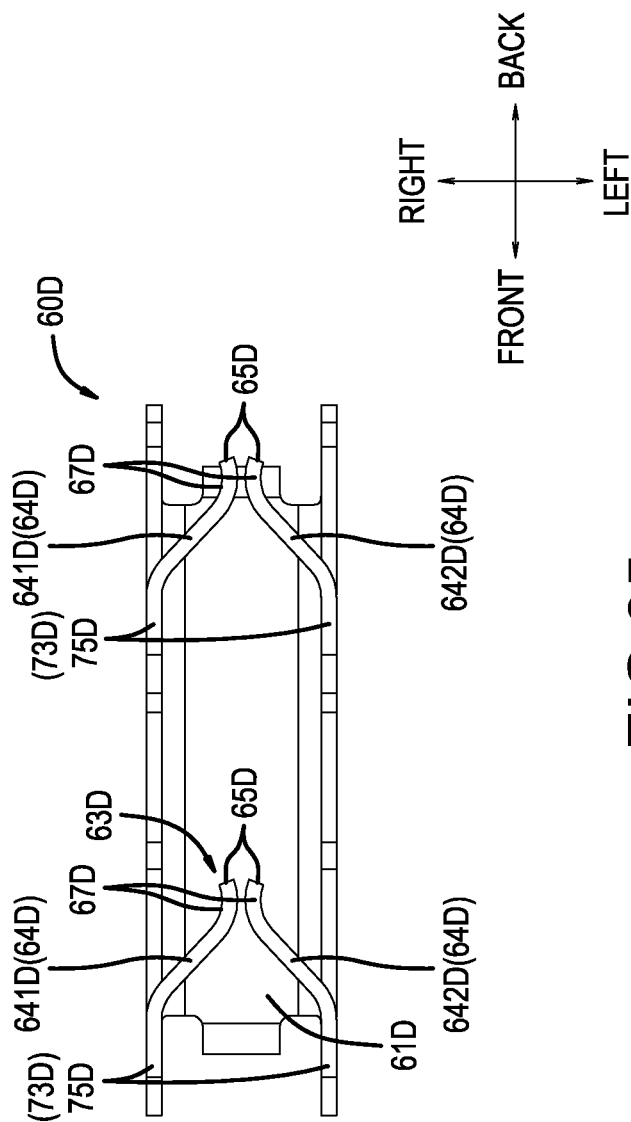
FIG. 35 is a top plan view that shows the terminal component according to the fifth embodiment.
Figure 36:
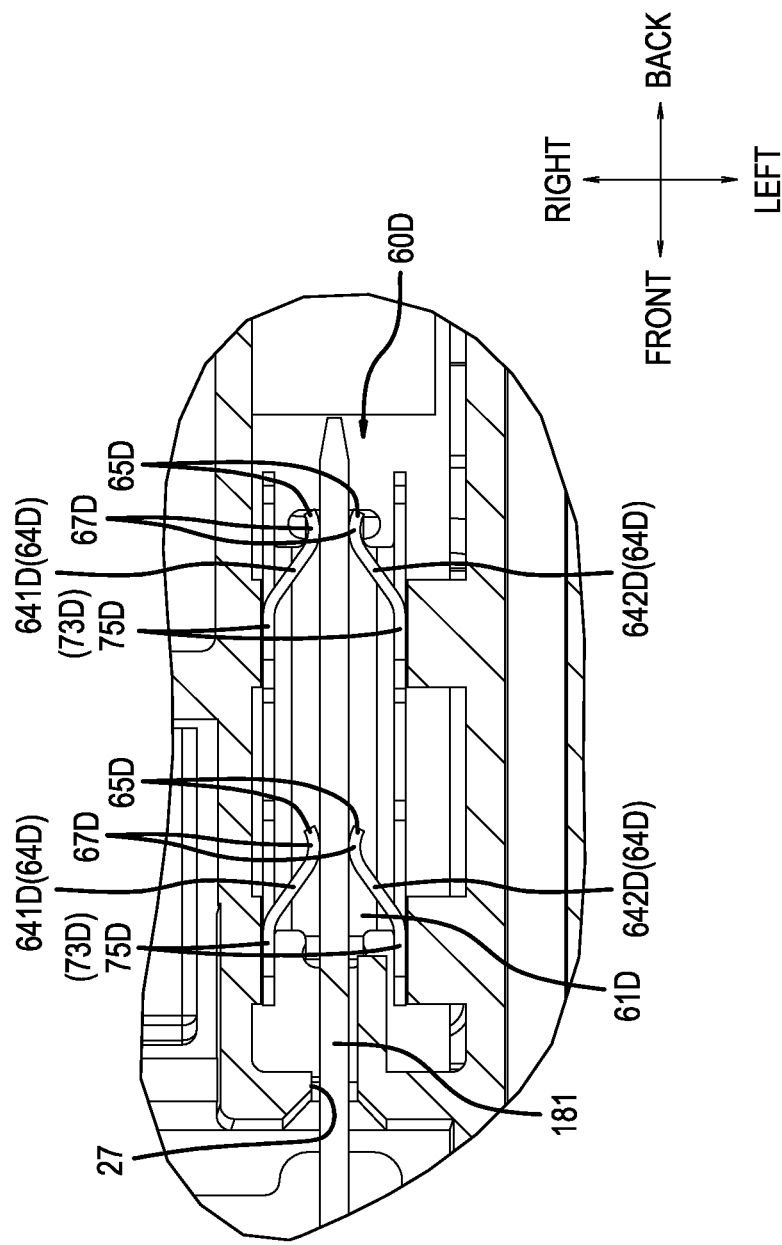
FIG. 36 is a plan view of the terminal components of FIG. 35 with a connection terminal inserted into the terminal component.
Figure 37:
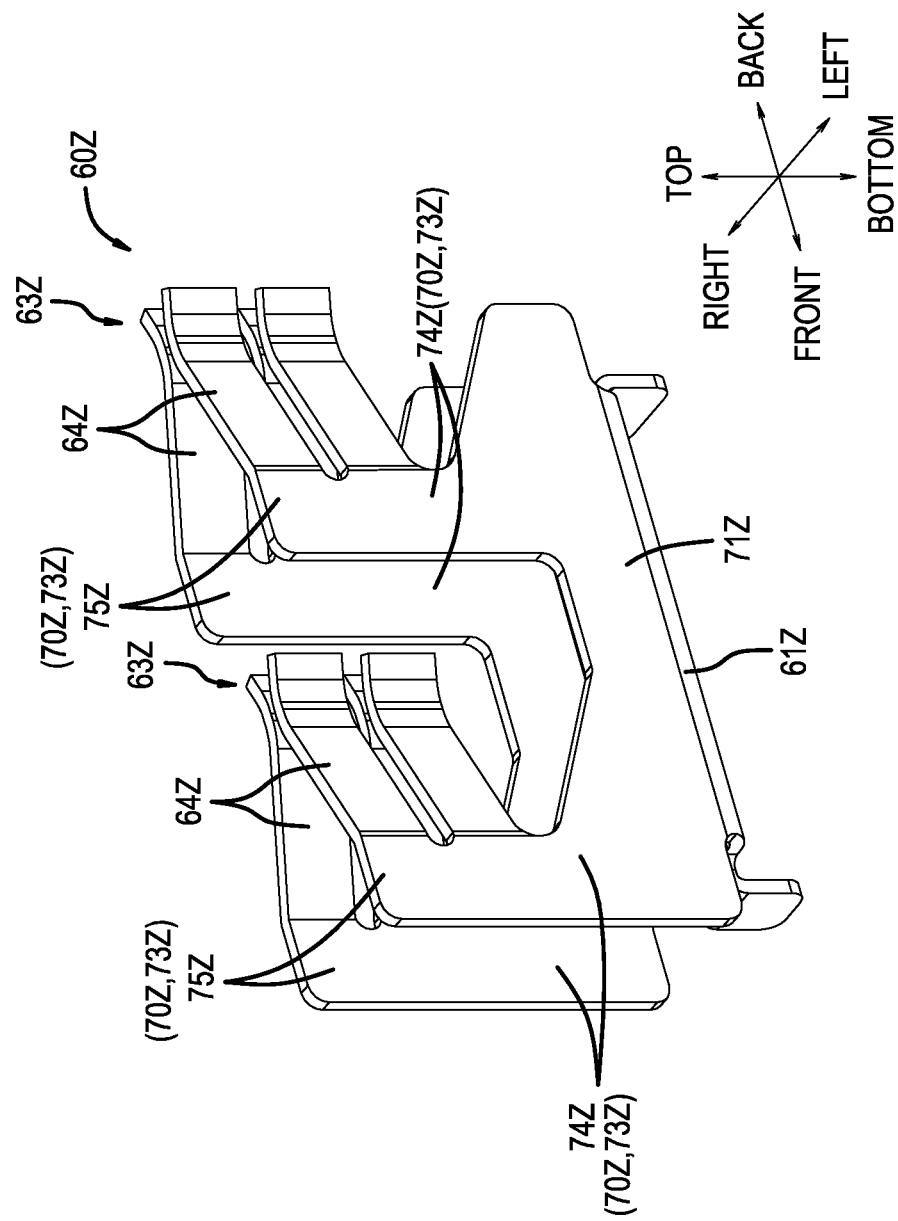
FIG. 37 is an oblique view of a conventional terminal component.

The terminal component 60D shown in FIG. 34 through FIG. 36 differs from the conventional terminal component 60Z shown in FIG. 37 and FIG. 38 only in the configuration of terminal parts 63D. Specifically, the terminal component 60D of the fifth embodiment comprises a support-seat part 61D, the terminal parts 63D, and support-frame parts 70D, substantially the same as in the above-mentioned terminal component 60. In the terminal component 60D of the fifth embodiment shown in FIG. 34 through FIG. 36, elements configured equivalently to those of the terminal component 60 of the first embodiment are identified by the same reference numerals that were used when the terminal component 60 of the first embodiment was explained, with the suffix 'D' appended, and therefore explanations thereof are omitted. In addition, in the conventional terminal component 60Z shown in FIG. 37 and FIG. 38, elements that are generally similar to those of the terminal component 60 of the first embodiment are identified using the same reference numerals that were used with the terminal component 60 of the first embodiment, with the suffix '7' appended thereto, and therefore explanations thereof are omitted.

As can be understood also from a comparison of FIG. 34 and FIG. 37 and of FIG. 36 and FIG. 38, each terminal part 63D of the terminal component 60D of the fifth embodiment has a length in the front-rear direction that is shorter than that of a terminal part 63Z of the conventional terminal component 60Z. The terminal parts 63D are likewise continuously connected to terminal-support parts 75D and are shaped such that they are split vertically into two levels that are lined up in a row. Each terminal part 63D substantially comprises a sandwiching-slant part 64D continuously connected to (continuously/unitarily formed with) the terminal-support part 75D that extends toward the rear side, and a folded-end part 65D further continuously connected on the rear side from the rear end of the sandwiching-slant part 64D. The sandwiching-slant parts 64D are formed such that the distance between opposing sandwiching-slant parts 64D narrows or decreases from the front side toward the rear side. Specifically, right-side sandwiching-slant parts 641D and left-side sandwiching-slant parts 642D are tilted (angled or inclined) with respect to the front-rear direction such that they approach one another in the direction of the rear side. Here, the tilt angle (with respect to the front-rear direction) at which the right-side sandwiching-slant parts 641D and the left-side sandwiching-slant parts 642D approach one another is larger than a tilt angle (again with respect to the front-rear direction) at which conventional right-side sandwiching-slant parts 641Z and left-side sandwiching-slant parts 642Z approach one another. Consequently, the length of each terminal part 63D in the front-rear direction is shorter than that of the conventional terminal part 63Z. Furthermore, an electrical-contact part 67D and the folded-end part 65D of each terminal part 63D are formed substantially identically to a conventional electrical-contact part 67Z and a conventional folded-end part 65Z.

As can be understood from the comparison of FIG. 38 and FIG. 40, in the terminal parts 63D described above, the right-side sandwiching-slant parts 641D and the left-side sandwiching-slant parts 642D have a higher degree of curvature deformation when the connection terminal 181 is sandwiched by the terminal parts 63D. Thus, as compared with the terminal parts 63Z of the conventional terminal component 60Z, the terminal parts 63D of the terminal component 60D of the fifth embodiment have (can apply) a higher (greater) contact load with respect to the sandwiched connection terminal 181. That is, in the terminal component 60D of the fifth embodiment, the contact load of the electrical contact made with the connection terminal 181 can be increased when the connection terminal 181 is being simply and plainly sandwiched. Accordingly, even if the design of the terminal component 60 is changed slightly, the sandwiching (squeezing) load applied by the terminal component 60 that sandwiches the connection terminal 181 can be maintained at an appropriate level that allows minor design changes to be made.

Furthermore, the power-tool battery pack according to the present invention is not limited to the above-mentioned embodiments, and it is understood that variations and modifications may be effected without departing from the spirit and scope of the invention. That is, the shape of the terminal component 60 constituting the female terminal is not limited to the examples that were illustrated and explained herein, and any appropriate configuration can be selected. For example, the female terminal according to the present disclosure could be configured such that, when the male terminal is being sandwiched, parts of the female terminal facing the sandwiching-wall parts serve as the abutting-support parts and are made to contact the sandwiching-wall parts. Furthermore, the specific configurations of the support-seat part, the support-frame part, the terminal part, and the like are not limited to the illustrative examples in the above-mentioned embodiments. For example, the number, shape, or the like of the terminal parts 63 of the terminal component 60 serving as the female terminal can be set and formed as appropriate.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

10 Impact driver (power tool)
11 Tool main body
13 Drive part
14 Grip part
15 Battery-mount part
17 Rail
181 Connection terminal (male terminal)
182 Communication terminal
19 Mating female part
20 Battery pack (power-tool battery pack)
21 Case
22 Screw member
23 Case main body
231 Retaining arcuate rib
232 Section rib
25 Case-cover part
26 Sliding-guide part
27 Slit (female opening)
281 Opening
282 Slit
291 Hook opening
292 Operation opening
293, 294 Ventilation ports
295 Female screw hole
30 Battery main body 31 Battery part
33 Battery cell
34 Electrode
35 Insulating sheet
36 Lead plate
361 Upper-end portion
37 Connection-end part
381 Cushioning sheet
383 Flow plate
385 Two-sided tape
39 Insulating sheet
41 Control part
42 Circuit board
43 Screw member
441 Ground terminal
442 Discharge terminal
45 Communication connector
461 Charging terminal
462 Communication terminal
47 Connection part
48 Lead wire
50 Cell holder
51 Protruding-column part
53 Threaded opening
54 Separator
55 Male-hook mechanism
56 Hook-shaped structural-body
57 Hook part
58 Operating part
59 Compression spring
60 Terminal component (female terminal)
61 Support-seat part
611 Seat body
615, 617 Board-coupling parts
63 Terminal part
631 Front-side terminal part
635 Rear-side terminal part
64 Sandwiching-slant part
641 Right-side sandwiching-slant part
642 Left-side sandwiching-slant part
65 Folded-end part
651 Right-side folded-end part
652 Left-side folded-end part
67(671, 672) Electrical-contact parts
70 Support-frame part
701 Right-side support-frame part
702 Left-side support-frame part
71 Edge body
73 Column part
731 Front-side column part
732 Rear-side column part
74 Column main body
741 Front-side end-edge part
742 Rear-side end edge part
75 Terminal-support part
80 Abutting-support part
81 Lower-side abutting-support part
82 Upper-side abutting-support part
85 Bend-restraining rib (end edge)
87C Bend-restraining rib (end edge)
90 Sectional structure
91 Front-wall part
915 Guide part
92 Upper-wall part
93 Section-rib part
94 Sandwiching-wall part
941 Ground-side sandwiching-wall part
942 Discharge-side sandwiching-wall part
95 Outer-side sandwiching-wall part
951 Section-wall body
952 Wall surface
961 Contact-rib part
963 Support-rectangle part
964 Seat
965 Assembly-slant part
966 Slanted planar surface
97 Inner-side sandwiching-wall part
98 Support-tab part
X Center axis

I claim:

1. A power-tool battery pack usable as a power supply of a power tool and capable of slidably attaching to and detaching from a tool main body of the power tool, the power-tool battery pack comprising:
at least one battery cell;
a case housing the at least one battery cell; and
a female terminal having inner sides configured to electrically connect to and sandwich a counterpart side male terminal of the tool main body as the battery pack is slidably attached to the tool main body, the female terminal being electrically connectable to the at least one battery cell;
wherein the case comprises a case main body housing the at least one battery cell and a case-cover part connected to the case main body;
the case-cover part comprises a female opening, which is configured to receive the male terminal, and sandwiching-wall parts, which are configured to sandwich the female terminal from outer sides of the female terminal; and
the female terminal and the sandwiching-wall parts are configured such that, at least when the female terminal sandwiches the male terminal, parts of the outer sides of the female terminal facing the sandwiching-wall parts serve as abutting-support parts and are caused to touch the sandwiching-wall parts.

2. The power-tool battery pack according to claim 1, wherein the female terminal and the sandwiching-wall parts are configured such that the female terminal and the sandwiching-wall parts do not contact and are spaced apart from one another when the female terminal is not sandwiching the male terminal.

3. The power-tool battery pack according to claim 1, wherein the female terminal comprises:
a support-seat part coupled to a circuit board,
terminal parts for sandwiching the male terminal, and
support-frame parts continuously connecting the support-seat part and the terminal parts; and
wherein the abutting-support parts of the female terminal are provided on the support-frame parts.

4. The power-tool battery pack according to claim 3, wherein a length of the abutting-support parts proximate to the support-seat part corresponds to a length of the support-seat part.

5. The power-tool battery pack according to claim 3, wherein the abutting-support parts are spaced from the sandwiching-wall parts by a smaller distance than the terminal parts are spaced from the sandwiching-wall parts.

6. The power-tool battery pack according to claim 1, wherein the sandwiching-wall parts each extend in an attachment-detachment sliding direction and demarcate an outer perimeter of the female terminal.

7. The power-tool battery pack according to claim 1, wherein the portions of the sandwiching-wall parts respectively contacted by the abutting-support parts each includes a contact-rib part that projects toward the female terminal.

8. The power-tool battery pack according to claim 3, wherein:
the circuit board extends in an attachment-detachment sliding direction;
the terminal parts of the female terminal extend in the attachment-detachment sliding direction; and
the support-frame parts of the female terminal extend in directions orthogonal to the attachment-detachment sliding direction.

9. The power-tool battery pack according to claim 3, wherein:
portions of the support-frame parts that are adjacent to the support-seat part extend in an attachment-detachment sliding direction; and
portions of the abutting-support parts that are adjacent to the support-seat part also extend in the attachment-detachment sliding direction.

10. The power-tool battery pack according to claim 1, wherein the female terminal is configured to be mirror-symmetric with respect to the male terminal when the female terminal sandwiches the male terminal.

11. The power-tool battery pack according to claim 3, wherein
end edges of the support-frame parts are folded in directions that intersect an attachment-detachment sliding direction.

12. The power-tool battery pack according to claim 1, wherein:
the female terminal comprises: a support-seat part coupled to a circuit board, terminal parts for sandwiching the male terminal, and support-frame parts continuously connecting the support-seat part and the terminal parts;
the abutting-support parts of the female terminal are provided on the support-frame parts;
the abutting-support parts are spaced from the sandwiching-wall parts by a smaller distance than the terminal parts are spaced from the sandwiching-wall parts; and
the portion of the sandwiching-wall part contacted by the abutting-support part includes a contact-rib part that projects toward the female terminal.

13. The power-tool battery pack according to claim 12, wherein:
the circuit board extends in an attachment-detachment sliding direction;
the terminal parts of the female terminal extend in the attachment-detachment sliding direction; and
the support-frame parts of the female terminal extend in directions orthogonal to the attachment-detachment sliding direction.

14. The power-tool battery pack according to claim 13 wherein:
portions of the support-frame part that are adjacent to the support-seat part extend in the attachment-detachment sliding direction,
portions of the abutting-support parts that are adjacent to the support-seat part extend in the attachment-detachment sliding direction,
the female terminal is configured to be mirror-symmetric with respect to the male terminal when the female terminal sandwiches the male terminal,
end edges of the support-frame parts are folded in directions that intersect the attachment-detachment sliding direction,
a length of the abutting-support parts proximate to the support-seat part corresponds to a length of the support-seat part, and
the sandwiching-wall parts each extend in the attachment-detachment sliding direction and demarcate an outer perimeter of the female terminal.

15. A power-tool battery pack usable as a power supply of a power tool and capable of attaching to and detaching from a tool main body of the power tool by sliding, the power-tool battery pack comprising:
at least one battery cell;
a case housing the at least one battery cell; and
a female terminal having first and second terminal parts having facing inner sides configured to resiliently separate to accommodate and apply an inward pressure against a counterpart male terminal slidingly inserted between the facing inner sides to form an electrical connection with the male terminal, the female terminal being electrically connectable to the at least one battery cell;
wherein the case comprises a case main body housing the at least one battery cell and a case-cover part connected to the case main body;
the case-cover part comprises: (i) an opening configured to receive the male terminal and (ii) sandwiching-wall parts facing one another on opposite sides of the female terminal, the sandwiching-wall parts being at least substantially parallel to the facing inner sides of the first and second terminal parts, and
the first and second terminal parts are configured to be shiftable between a first configuration and a second configuration by inserting the male terminal between the facing inner sides, such that abutting-support parts of the female terminal are spaced from the sandwiching-wall parts in the first configuration and the abutting-support parts of the female terminal contact the sandwiching-wall parts in the second configuration.

16. The power-tool battery pack according to claim 15, wherein
the female terminal comprises: a support-seat part coupled to a circuit board, and support-frame parts continuously connecting the support-seat part and the first and second terminal parts; and
the abutting-support parts of the female terminal are provided on the support-frame parts.

17. The power-tool battery pack according to claim 16, wherein:
the abutting-support parts are spaced from the sandwiching-wall parts by a smaller distance than the first and second terminal parts are spaced from the sandwiching-wall parts.

18. The power-tool battery pack according to claim 17, wherein:
the portion of the sandwiching-wall part contacted by the abutting-support part includes a contact-rib part that projects toward the female terminal.

19. The power-tool battery pack according to claim 15, wherein:
the portion of the sandwiching-wall part contacted by the abutting-support part includes a contact-rib part that projects toward the female terminal.

* * * * *